United States Patent [19]

Maucher

[11] Patent Number: 5,727,666
[45] Date of Patent: Mar. 17, 1998

[54] SELF-ADJUSTING FRICTION CLUTCH

[75] Inventor: Paul Maucher, Sasbach, Germany

[73] Assignee: LuK Lamellen und Kupplungsbau GmbH, Bühl, Germany

[21] Appl. No.: 630,336

[22] Filed: Apr. 10, 1996

Related U.S. Application Data

[63] Continuation of Ser. No. 171,662, Dec. 21, 1993, abandoned.

[30] Foreign Application Priority Data

Dec. 22, 1992 [DE] Germany ............ 42 43 567.6

[51] Int. Cl.⁶ .................................................. F16D 13/75
[52] U.S. Cl. ........................... 192/70.25; 192/111 A
[58] Field of Search ................... 192/70.25, 111 A

[56] References Cited

U.S. PATENT DOCUMENTS

| | | |
|---|---|---|
| 3,323,624 | 6/1967 | Maurice . |
| 4,828,083 | 5/1989 | Naudin . |
| 4,924,991 | 5/1990 | Takeuchi .................. 192/111 A |
| 5,186,298 | 2/1993 | Takeuchi . |
| 5,409,091 | 4/1995 | Reik et al. .................. 192/70.25 |

FOREIGN PATENT DOCUMENTS

| | | |
|---|---|---|
| 36 31 863 A1 | 3/1988 | Germany . |
| 4239291 | 5/1993 | Germany .................. 192/111 A |
| 1 361 649 | 7/1974 | United Kingdom . |

*Primary Examiner*—Richard M. Lorence
*Attorney, Agent, or Firm*—Darby & Darby

[57] ABSTRACT

A friction clutch wherein changes in the axial position of the rotary pressure plate in a direction toward the counterpressure plate as a result of wear upon the friction linings between such plates are compensated for by an automatic adjusting system between the diaphragm spring and the pressure plate or between the diaphragm spring and the rear wall of the housing of the friction clutch. The compensating unit employs two concentric rings which can be rotated and thereby moved axially toward the diaphragm spring only when the friction linings have undergone initial wear or upon renewed wear following an adjustment.

78 Claims, 11 Drawing Sheets

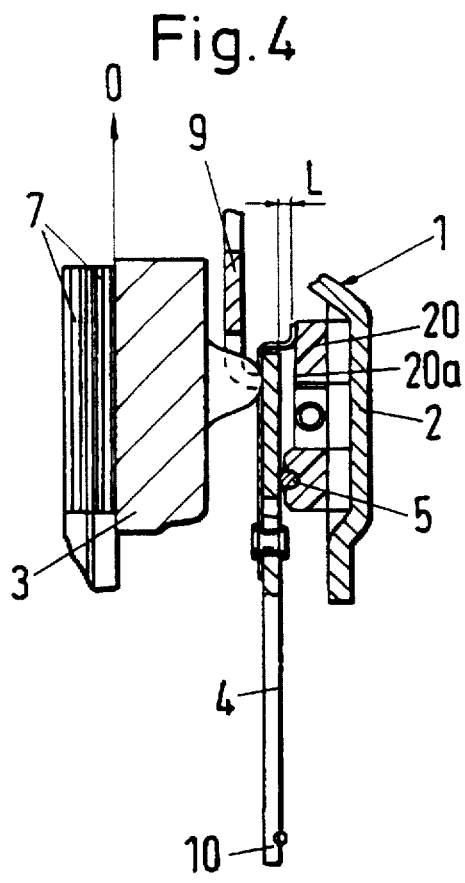
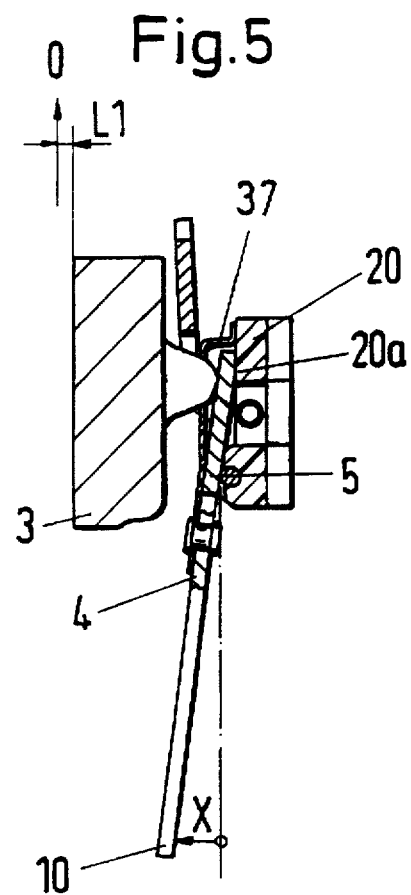
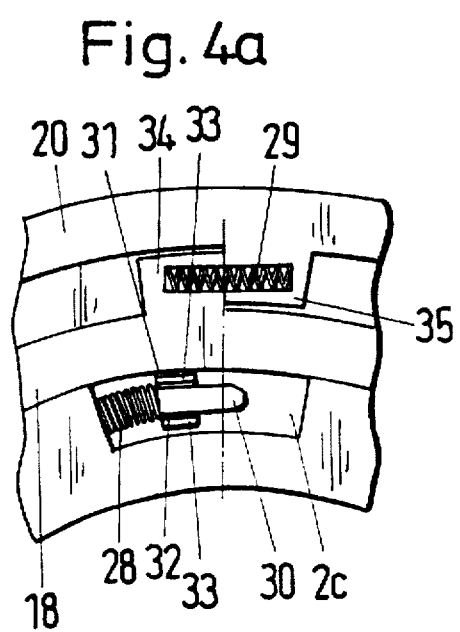
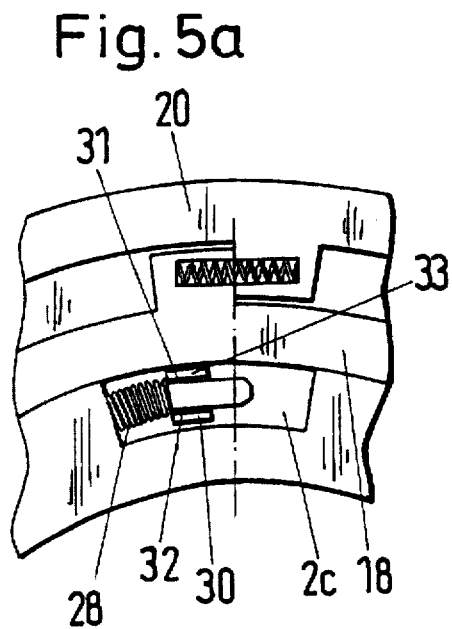

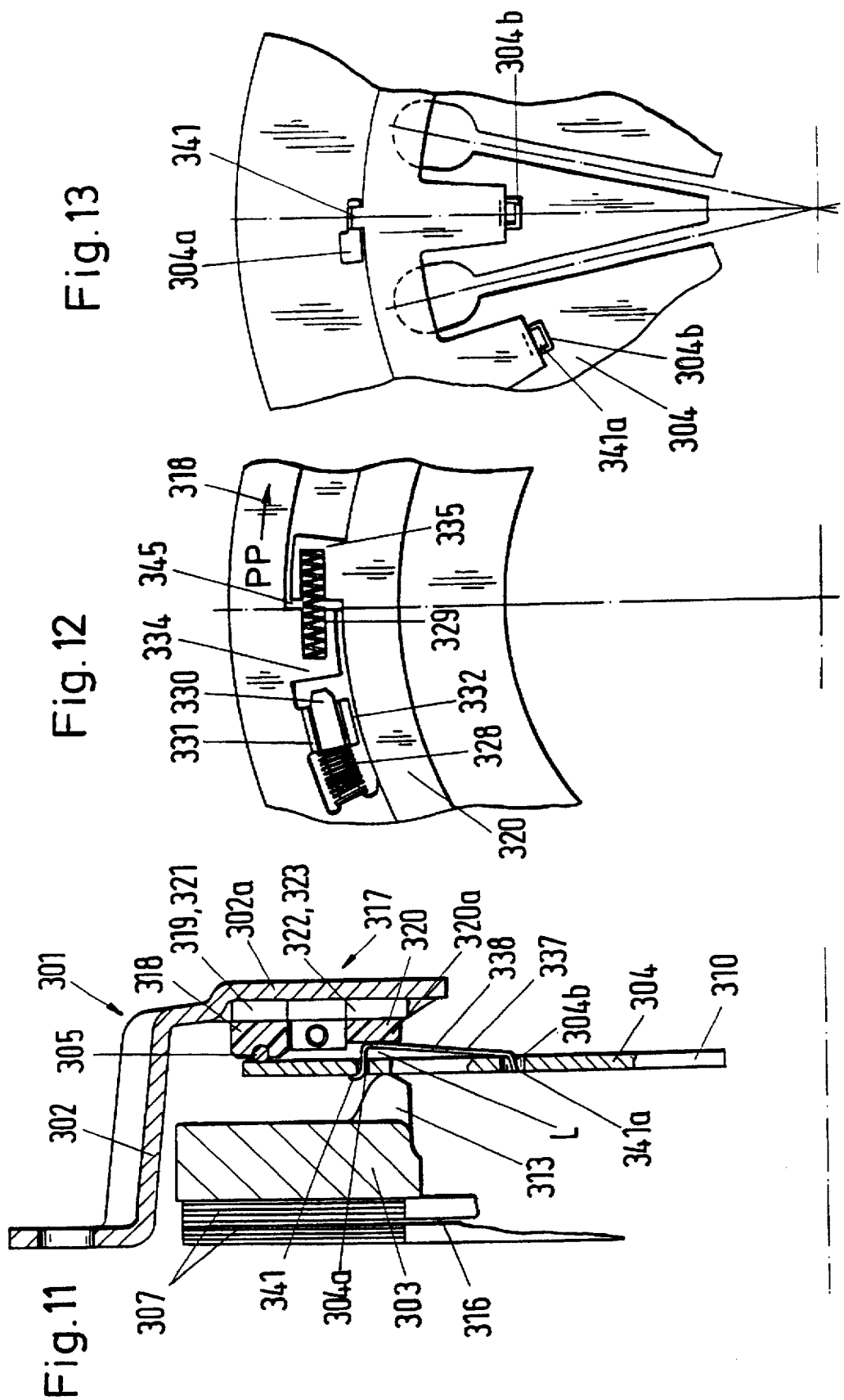

Fig. 18
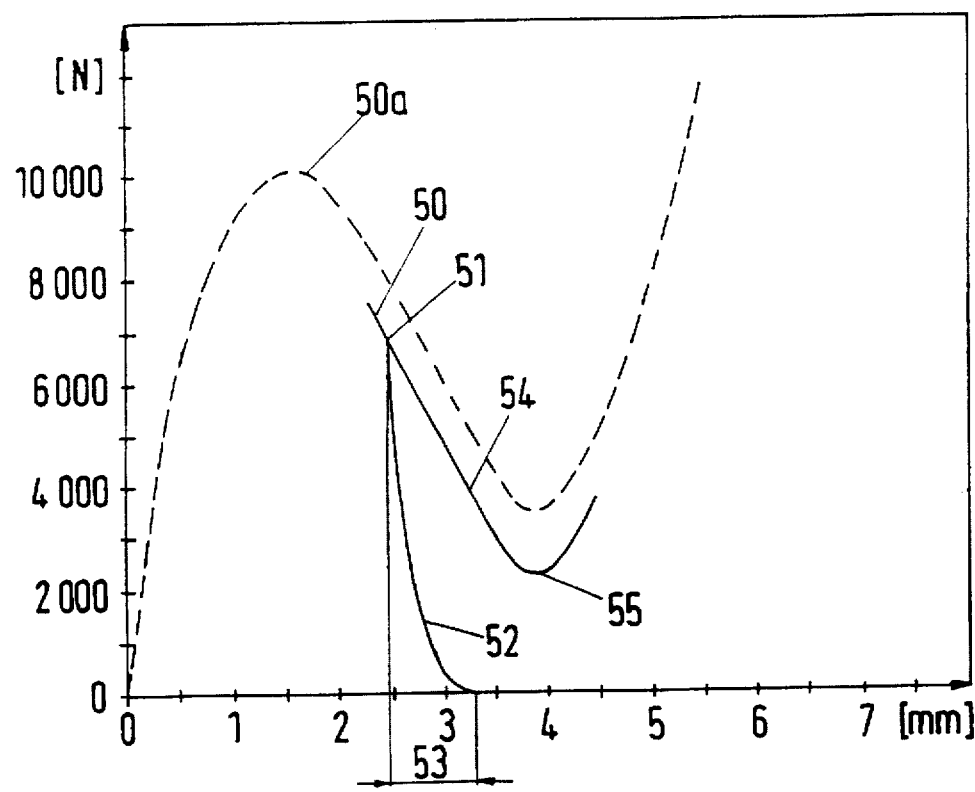
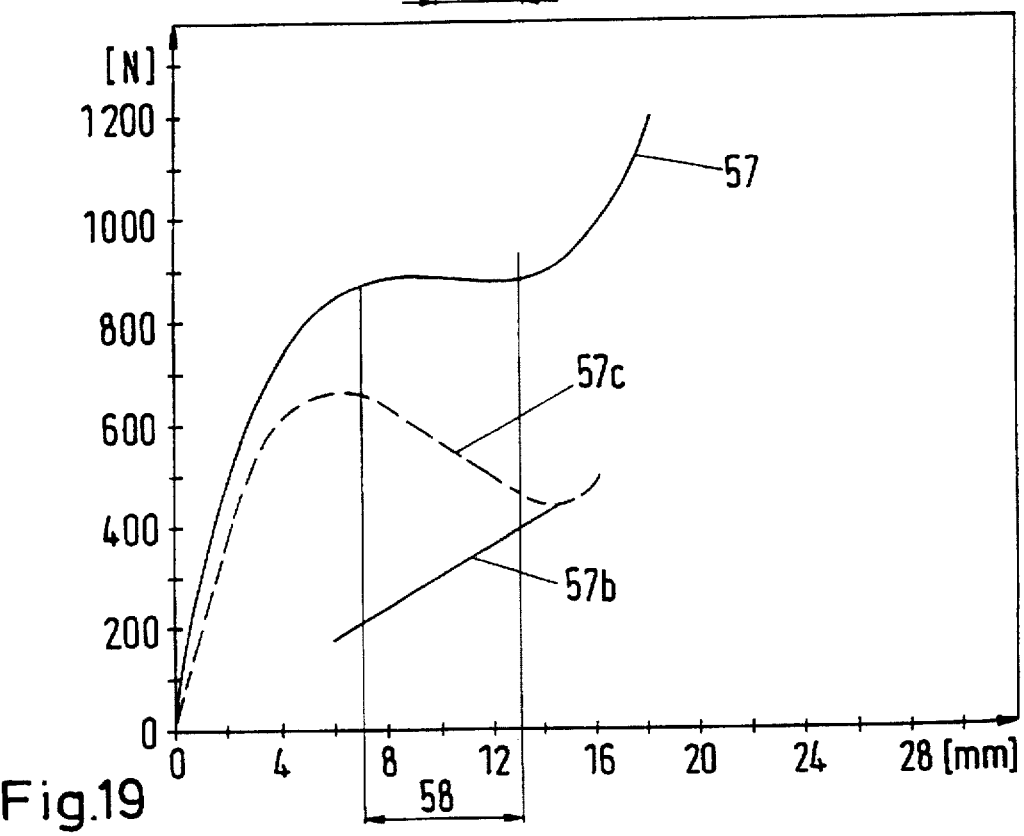
Fig. 19

SELF-ADJUSTING FRICTION CLUTCH

This is a continuation of application Ser. No. 08/171,662, filed Dec. 21, 1993 now abandoned.

CROSS-REFERENCE TO RELATED CASES

The self-adjusting friction clutch of the present invention constitutes an improvement over and a further development of friction clutches disclosed in copending patent applications Ser. Nos. 07/982,178 (filed Nov. 25, 1992 by Paul Maucher for "Friction Clutch" and abandoned in favor of application Ser. No. 08/284,737 filed Aug. 1, 1994) and 07/982,184 (filed Nov. 25, 1992 by Wofgang Reik et al. for "Automatically Adjustable Friction Clutch" and now U.S. Pat. No. 5,409,091).

BACKGROUND OF THE INVENTION

The present invention relates to improvements in so-called self-adjusting or automatically adjustable friction clutches of the type often utilized in motor vehicles and the like. More particularly, the invention relates to improvements in friction clutches of the type wherein a pressure plate is axially movably coupled, but non-rotatably coupled, to a rotary housing or cover. The cover is fixedly connected to, and can be rotated by, a counterpressure plate that receives torque from a prime mover (such as a combustion engine in a motor vehicles). A clutch disc is interposed between the two plates to receive torque and to drive a shaft or the like (e.g., to drive the input shaft of a variable-speed transmission in a motor vehicle) when a diaphragm spring or another biasing device is free, or is compelled, to bias the pressure plate toward the counterpressure plate. As a rule, friction clutches of the just outlined character can be engaged or disengaged by tilting the diaphragm spring, normally by applying a push or a pull to the tips of radially inwardly or outwardly extending prongs forming part of the diaphragm spring.

U.S. Pat. No. 5,186,298 discloses means for automatically adjusting the position of the pressure plate relative to the counterpressure plate in response to wear upon the friction linings of the clutch disc and (if necessary) in response to wear upon certain other parts, such as the friction surfaces of the two plates. The purpose of automatic adjustment is to ensure that the bias or clamping action of the friction surfaces on the pressure plate and counterpressure plate upon the adjacent friction linings of the clutch disc remains unchanged irrespective of the extent of wear of the friction linings and the friction surfaces of the two plates. The German patent application proposes the utilization of a wear compensating system which employs two annular members and is designed in such a way that the annular members can move axially in response to wear of the friction linings. Such axial adjustment of the annular members determines the axial position of the location(s) of engagement between the diaphragm spring and the pressure plate and thus compensates for wear, at least of the friction linings. Thus, the position of the diaphragm spring should remain unchanged (namely the same as in a new friction clutch) regardless of the extent of wear upon the friction linings.

A drawback of the friction clutch which is disclosed in the aforementioned published German patent application is that the radial distance of the contact points on the diaphragm spring between the two annular members (one of which surrounds the other) is too small. Moreover, the friction clutch of the German patent application does not allow for accurate initial or subsequent adjustment of the pressure plate, partly due to matching tolerances (especially as concerns the thickness of the annular members in the axial direction of the pressure plate) and partly due to progressive wear of the diaphragm spring and its seat in the friction clutch. A pronounced increase of the distance between the inner and outer annular members is not possible because this would greatly reduce the extent of mobility of the pressure plate in response to engagement or disengagement of the friction clutch, i.e., the distance of the pressure plate from the counterpressure plate in engaged and disengaged conditions of the friction clutch would be too small. An undue reduction of such distance would affect the operability of the friction clutch, i.e., attempted disengagement of the friction clutch would not result in an interruption of transmission of torque between the pressure plate and the counterpressure plate on the one hand, and the friction linings of the clutch disc on the other hand.

An additional drawback of the friction clutch which is disclosed in the aforementioned German patent application is that the pressure plate (which is normally affixed to the housing of the friction clutch by leaf springs serving to permit axial movements, but to prevent rotation of the pressure plate relative to the housing and relative to the counterpressure plate) is free to oscillate in the axial direction when the friction clutch is disengaged. This can result in undesirable adjustment of the annular members relative to the pressure plate in a direction toward the diaphragm spring while the pressure plate is in the process of moving axially and away from the diaphragm spring. Upon the next-following engagement of the friction clutch, the diaphragm spring is likely to assume an improper position (namely a position corresponding to a partially disengaged condition of the friction clutch) with the result that the bias of the diaphragm spring upon the pressure plate in the engaged condition of the friction clutch would depart from the bias during preceding engagement. This would prevent full disengagement of the friction clutch when the operator desires to interrupt the transmission of torque between the pressure plate and the counterpressure plate on the one hand, and the clutch disc (i.e., the friction linings) on the other hand.

OBJECTS OF THE INVENTION

An object of the invention is to provide a self-adjusting friction clutch which is capable of more accurate automatic adjustment to compensate for wear than heretofore known self-adjusting friction clutches.

Another object of the invention is to provide a novel and improved wear compensating unit for use in a friction clutch, such as a friction clutch in the power train between the engine and the wheels of a motor vehicle.

A further object of the invention is to provide a friction clutch with a simple and compact wear compensating system.

An additional object of the invention is to provide a self-adjusting friction clutch wherein all automatic adjustments are highly accurate during the initial stage as well as during advanced stages of wear upon the friction linings and/or upon other component parts of the friction clutch.

Still another object of the invention is to provide a wear compensating system which can be utilized with equal or similar advantage in push-type friction clutches and in pull-type friction clutches.

A further object of the invention is to provide a friction clutch with an automatic wear compensating system which is designed to prevent and to practically exclude untimely and/or inaccurate adjustments of one or more parts while compensating for wear upon the friction linings of the clutch disc.

Another object of the invention is provide a friction clutch with a compact and inexpensive wear compensating system which does not or need not contribute to space requirements and/or to the weight of the friction clutch.

An additional object of the invention is to provide a novel and improved method of rapidly and conveniently assembling the components of the aforementioned friction clutch and its wear compensating system.

Still another object of the invention is to provide a power train which embodies a friction clutch of the above-outlined character.

A further object of the invention is to provide a motor vehicle which embodies the aforediscussed friction clutch and its novel and improved wear compensating system.

Another object of the invention is to provide a novel and improved housing, and a novel and improved pressure plate for use in the above-outlined friction clutch.

An additional object of the invention is to provide a novel and improved diaphragm spring for use in the above-outlined friction clutch.

Still another object of the invention is to provide novel and improved means for opposing the bias of the diaphragm spring in a friction clutch of the above-outlined character.

A further object of the invention is to provide a self-adjusting friction clutch which can be installed in motor vehicles or elsewhere as a superior substitute for heretofore known and used self-adjusting friction clutches.

Another object of the invention is to provide novel and improved method of monitoring the extent of wear upon the friction linings of a friction clutch disc and, if necessary, upon certain other parts of the clutch.

An additional object of the invention is to provide a novel and improved method of preventing untimely adjustments of a friction clutch to compensate for wear upon the friction linings of its clutch disc or clutch plate.

Still another object of the invention is to provide the above-outlined friction clutch with novel and improved means for compensating for undesirable axial shifting of the pressure plate relative to the counterpressure plate, and relative to the housing or cover.

A further object of the invention is to provide a wear compensating system which automatically responds to detectable wear upon the friction surfaces of the pressure plate and counterpressure plate and/or upon the friction linings of the clutch disc.

Another object of the invention is to provide a novel and improved method of utilizing the changes of conicity of the diaphragm spring in a self-adjusting friction clutch.

SUMMARY OF THE INVENTION

One feature of the present invention resides in the provision of an engageable and disengageable friction clutch, particularly for use in power trains between the engines and the wheels of motor vehicles. The improved friction clutch comprises a first component including a housing rotatable about a predetermined axis, a second component including a rotary pressure plate, a third component including means (such as a set of leaf springs) for non-rotatably connecting the pressure plate to the housing with limited freedom of movement in the direction of the predetermined axis, a fourth component including a rotary counterpressure plate which is adjacent the pressure plate and can be driven by a prime mover or the like, a fifth component including a torque transmitting clutch disc disposed between the two plates and having friction linings which are subject to wear as a result of repeated engagement with and disengagement from the friction surfaces of the two plates in response to repeated engagement and disengagement of the friction clutch, a sixth component including a normally frustoconical diaphragm spring which is disposed between the housing and the pressure plate to normally bias the pressure plate toward the clutch disc so that the friction linings are clamped between the two plates, a seventh component including means (e.g., a bearing of one or more levers) for engaging and disengaging the friction clutch, and means for automatically compensating for wear at least upon the friction plates and upon the diaphragm spring. The improved wear compensating means comprises two adjustable rings disposed at different radial distances from the predetermined axis and carried by one of the aforementioned components (e.g., by the housing or by the pressure plate) for displacement in the direction of the predetermined axis toward the diaphragm spring (e.g., toward that side of the diaphragm spring which confronts the pressure plate or toward that side of the diaphragm spring which confronts the housing), and means for adjusting the rings. The adjusting means can comprise a displacing device which is turnable (at least in part) about the predetermined axis and means for turning the displacing device (or a portion of the displacing device) about the predetermined axis.

The one component preferably constitutes one of the first and second components, i.e., the two rings can be carried by the housing or by the pressure plate of the improved friction clutch.

The aforementioned displacing device of the adjusting means forming part of the wear compensating means can comprise ramps, e.g., a set of ramps on one of the rings, a complementary second set of ramps on the pressure plate or on the housing, a third set of ramps on the other ring and a complementary fourth set of ramps on the pressure plate or the housing.

The arrangement is preferably such that at least one portion of a plurality of portions forming part of the diaphragm spring and located at different radial distances from the predetermined axis bears against one of the two rings in engaged condition of the friction clutch to thereby prevent turning of at least a portion of the displacing device, particularly of the two rings and their (first and third) ramps relative to the pressure plate, the housing or the diaphragm spring and the complementary (second and fourth) ramps. The displacing device can include a first displacing unit for the one ring and a second displacing unit for the other ring, and the wear compensating means can further comprise a wear detector which arrests the second displacing unit to prevent adjustment of the other ring but permits the second displacing unit to adjust the other ring in the engaged condition of the friction clutch after the friction linings have undergone at least some wear (i.e., an amount of wear which is detectable by and can be compensated for by the wear compensating means). The wear detector (e.g., a leaf spring or a resilient membrane) is operative to prevent adjustment of the other ring during disengagement of the friction clutch. The wear compensating means can further comprise means (e.g., in the form of radially extending arms on the two rings) for blocking adjustment of the one ring prior to adjustment of the other ring and for permitting adjustment of the one ring upon completed adjustment of the other ring as a result of subsequent disengagement of the friction clutch.

The rings are rotatable (turnable) relative to each other about the axis of the pressure plate, and the means for turning can comprise coil springs and/or other suitable energy storing elements which bias the rings to turn about the axis of the pressure plate by urging the first and third ramps to move relative to the second and fourth ramps, respectively.

The conicity of the diaphragm spring is changed as a function of wear upon the friction linings of the clutch disc. The aforementioned wear detector of the improved wear compensating means prevents adjustment of the rings during disengagement of the friction clutch but permits adjustment of the rings in response to a change of conicity of the diaphragm spring as a result of wear upon the friction linings. The pressure plate is moved by the diaphragm spring through a distance which is commensurate with the extent of wear upon the friction linings.

The wear compensating means can operate between the housing and th diaphragm spring or between the pressure plate and the diaphragm spring. The entire wear compensating means or at least a portion thereof can be installed between the housing and the diaphragm spring or between the diaphragm spring and the pressure plate, as seen in the direction of the axis of the rotation of the pressure plate, counter-pressure plate, housing, clutch disc and diaphragm spring.

The rings are movable in the direction of the aforementioned axis in response to engagement and disengagement of the friction clutch if the one component (such component carries the rings) is the pressure plate, i.e., a component which is movable in the direction of its rotational axis toward and away from the counterpressure plate.

The rings do not share the axial movements of the pressure plate during engagement and disengagement of the friction clutch if they are mounted on a component other than the one including the pressure plate, such as the first component including the rotary housing or cover of the friction clutch.

The aforementioned wear detector of the wear compensating means can be designed to include means for preventing adjustment of at least one of the two rings during disengagement of the friction clutch, preferably for preventing adjustment of at least one of the rings with a variable force. The arrangement is preferably such that the variable force increases in response to progressing disengagement of the friction clutch.

As already mentioned above, the rings are preferably rotatable about the axis of the pressure plate, and the displacing device (such as the aforedescribed device including sets of ramps on the rings and sets of complementary ramps on the pressure plate or on the housing) includes means for moving the rings in the direction of the aforementioned axis in response to rotation of the rings by the turning means (e.g., turning means including coil springs at least one of which reacts against the one component and bears against one of the rings and at least one other of which reacts against the one ring and bears against the other ring). The wear detector (this wear detector prevents rotation of at least one of the rings in the engaged condition of the friction clutch) of the wear compensating means in such friction clutch can comprise at least one section which is resilient in the direction of the rotational axis of the pressure plate to bias the at least one ring and one of the components (such as the sixth component including the diaphragm spring)—in the engaged condition of the friction clutch and in the absence of wear or after completion of the compensation for wear upon the friction linings—with a force which prevents rotation of the at least one ring under the action of the turning means. The at least one section of the wear detector permits the at least one ring to be rotated by the turning means and the corresponding unit of the displacing device the in engaged condition of the friction clutch. The at least one section of the wear detector is designed to at least reduce the aforementioned rotation preventing force depending on the change of conicity of the diaphragm spring in response to wear upon the friction linings. Otherwise stated, the at least one section of the wear detector is designed to at least reduce the aforementioned rotation preventing force in dependence on the extent of axial movement of the pressure plate in response to wear upon the friction linings. The turning means is further designed to overcome the inertia of the at least one ring to thus rotate the at least one ring about the aforementioned axis when such ring is free to turn in order to compensate for wear upon the friction linings.

The aforementioned at least one section of the wear detector can be made of a resilient material, e.g., sheet metal. For example, the at least one resilient section of the wear detector can include or constitute a leaf spring or a diaphragm spring, and such at least one resilient section is preferably installed in the friction clutch in a prestressed condition, i.e., so that it stores at least some energy.

The wear detector of the improved wear compensating means can be fastened to the diaphragm spring of the sixth component of the improved friction clutch by rivets and/or in another suitable way.

The wear detector can be constructed and mounted in such a way that it includes a first portion disposed at a first radial distance from the rotational axis of the pressure plate and affixed to the diaphragm spring, and a second portion disposed at a different second radial distance from the axis and bearing against one of the rings. Such wear detector can further comprise a third portion which bears against the diaphragm spring. The first portion of the just outlined wear detector can be resilient, and the second portion of such wear detector can be spaced apart from the housing when the friction clutch is in the engaged condition but is moved toward the housing by the pressure plate in response to disengagement of the friction clutch.

The wear detector (e.g., a composite wear detector) can be constructed, assembled and installed to prevent adjustment of at least one of the two rings during disengagement of the friction clutch. Such a wear detector can be provided on the at least one ring, and this ring can comprise a plurality of at least substantially coaxial annular sections which are biased (preferably by the wear detector) axially and away from each other. The at least one ring can include an undulate resilient washer or it can comprise two concentric rings with one or more springs between them to bias the concentric rings axially and away from each other to the extent determined by suitable stops, e.g, the heads of rivets or the like.

As already mentioned above, the means for turning the rings of the wear compensating means in order to account for wear upon the friction linings can include one or more springs, e.g., at least one first coil spring which reacts against the one component (carrying the rings) and bears against one of the two rings, and at least one second coil spring which reacts against the one ring and bears against the other ring in order to change the angular position of the other ring relative to the one ring. The springs which bias the two rings of the wear compensating means can be installed to operate in series. The at least one first spring can store more energy than the at least one second spring, i.e., the at least one (first) spring can turn the one ring (upon completed turning of the other ring) against the opposition of the at least one second spring.

The displacing device and the turning means of the improved wear compensating means can be designed to operate in such a way that one of the rings is rotated about the axis of the pressure plate in a predetermined direction ahead of the other ring. The aforementioned arms or other suitable abutments of blocking means on or at the rings ensure that rotation of the other ring is blocked prior to rotation of the one ring. The abutment of the other ring is preferably located behind the abutment of the one ring (as seen in the direction of rotation of the rings to compensate for wear upon the friction linings), and the abutment of the other ring engages the abutment on the one ring prior to rotation of the one ring ahead of the other ring. The extent of angular movement of the one ring is indicative of the extent of wear upon the friction linings, and the other ring is thereupon rotated until arrested by the abutment of the one ring to thus effect a requisite axial displacement of the pressure plate in a direction toward the counterpressure plate and to thereby effect a change of conicity of the diaphragm spring as well as to compensate for wear upon the friction linings.

The diaphragm spring of the sixth component can form part of the wear compensating means. For example, such diaphragm spring can serve as a means for preventing rotation of one of the two rings in the disengaged condition of the friction clutch. Thus, the diaphragm spring of the sixth component of the friction clutch can be used to prevent adjustment of the one ring in the disengaged condition of the friction clutch.

One of the two rings is or can be spaced apart from another of the seven components of the friction clutch (for example, from the diaphragm spring of the sixth component) in the engaged condition of the friction clutch by a distance which is at least reduced in the disengaged condition of the clutch. The one ring or the other component is movable in the direction of the rotational axis of the pressure plate relative to the other component or the one ring.

If the diaphragm spring of the sixth component of the improved friction clutch forms part of the wear compensating means, it can be designed to bias one of the two rings against the housing (provided that the two rings are installed between the housing and the diaphragm spring) in the disengaged condition of the friction clutch. Alternatively, the diaphragm spring can constitute one of two or more means for biasing the one ring against the housing, or the one ring can be biased against the housing by a part other than the diaphragm spring of the sixth component of the friction clutch.

The arrangement can be such that, if at least one of the two rings is installed between the pressure plate and the diaphragm spring, the at least one ring can be biased against the diaphragm spring in the disengaged condition of the friction clutch. It is even possible to mount at least one of the rings between the pressure plate and the diaphragm spring and to cause the at least one ring to bear against the housing in the disengaged condition of the friction clutch.

The construction of the improved friction clutch can be such that the diaphragm spring abuts one of the two rings at a first radial distance from the rotational axis of the pressure plate and that the diaphragm spring abuts one of the first, second, third, fourth and fifth components at a second radial distance from the axis. The difference between the radial distances of the two rings from each other can constitute at least 30 percent of the difference between the first and second radial distances. The design of the friction clutch can be such that the difference between the first and second radial distances at least approximates the difference between the radial distances of the two rings from the axis.

The wear detector of the wear compensating means can be designed and mounted to undergo deformation through a first distance in response to disengagement of the friction clutch, and the pressure plate is movable in response to disengagement of the friction clutch in the direction of its rotational axis through a second distance which at least approximates the first distance.

At least one of the rings can be provided on the housing and the wear detector can include a portion which is movable relative to the diaphragm spring through a distance $S \geq SD \times (L2:L1)$ wherein SD is the distance covered by the pressure plate for disengagement of the friction clutch, L1 is the difference of radial distances of the two rings from the rotational axis of the pressure plate, and L2 is the difference between the radial distance of one of the rings and the radial distance of a location of contact between the diaphragm spring and the pressure plate.

If the friction clutch is a pull-type friction clutch (i.e., if the means for disengaging it includes means for pulling a portion of the diaphragm spring to disengage the clutch) and the rings of the wear compensating means are disposed between the diaphragm spring and the housing, the diaphragm spring can constitute a one-armed lever privotable or tiltable relative to the ring which is more distant from the axis of the pressure plate, at least during a first stage of disengagement of the friction clutch.

Alternatively, a pull-type friction clutch which embodies the present invention can be constructed in such a way that the diaphragm spring constitutes a one-armed lever pivotable or tiltable relative to the ring which is more distant from the axis of the pressure plate during disengagement of the friction clutch. The rings of the wear compensating means in such a friction clutch can be located between the pressure plate and the diaphragm spring.

If the friction clutch is a push-type friction clutch (i.e., if the means for engaging and disengaging includes a bearing or other means for pushing a portion of the diaphragm spring during disengagement of the clutch), the diaphragm spring can constitute a two-armed lever which is pivoted relative to the ring located radially inwardly of the other ring, at least during a certain stage of disengagement of the friction clutch. The rings of the wear compensating means in such a push-type friction clutch are or can be located between the diaphragm spring and the pressure plate.

Alternatively, a push-type friction clutch which embodies the present invention can be constructed in such a way that the two rings of the wear compensating means are located between the housing and the diaphragm spring and the diaphragm spring constitutes or acts not unlike a two-armed lever which is pivoted relative to the radially outer ring of the two rings during a phase of disengagement of the friction clutch.

The complementary ramps of the displacing device in the wear compensating means can be of one piece with the housing; for example, they can be stamped into the end wall of the housing. The housing can be provided with one or more passages, particularly, between neighboring ramps of the second and/or fourth set of ramps, to permit the flow of cool atmospheric air or another coolant which withdraws heat from the pressure plate, from the diaphragm spring, from the sensor, from the wear detector and/or from the friction linings of the clutch disc.

Alternatively, the ramps which are complementary to the ramps on the two rings can be provided directly on the pressure plate. It is also possible to provide the pressure plate with a separately produced attachment which is or which can be of one piece with the complementary ramps, to support the ramps of the two rings. Furthermore, the pressure plate and its attachment can define at least one recess which serves as a channel for the flow of a coolant, preferably at least in part radially of the pressure plate.

A seat for the diaphragm spring of the sixth component of the improved friction clutch can be provided on or installed in or on one of the two rings forming part of the wear compensating means.

If the friction clutch is a push-type clutch, at least a portion of the wear compensating means can be disposed between the diaphragm spring and the housing, and the clutch can further comprise a resilient sensor bearing against one side of the diaphragm spring, namely against that side which faces away from the aforementioned portion of the wear compensating means.

The sensor can be made of a resilient material and can define for the diaphragm spring a fulcrum to permit tilting of the diaphragm spring, at least during a first stage of the disengagement of the friction clutch. The arrangement can be such that a radially outer portion of the diaphragm spring engages one of the two rings upon completion of the first stage of disengagement of the clutch, and the diaphragm spring thereupon pivots relative to the one ring during a second stage of disengagement of the friction clutch. The one ring is that which is disposed radially outwardly of the other ring, i.e., at a greater distance from the rotational axis of the pressure plate.

If the wear compensating means is disposed between the diaphragm spring and the pressure plate, the resilient sensor can be provided with means reacting against the housing or against the pressure the pressed with means for bearing against the pressure plate or against the housing.

Another feature of the present invention resides in the provision of an engageable and disengageable friction clutch which can be utilized with advantage in motor vehicles and comprises an axially fixed component (such as a clutch housing or cover) which is rotatable about a predetermined axis, a pressure plate, means (e.g., a set of leaf springs) for non-rotatably connecting the pressure plate to the component with freedom of movement in the direction of the predetermined axis, a rotary counterpressure plate which is adjacent the pressure plate, a torque transmitting clutch disc which is disposed between the two plates and has friction linings which are subject to wear in response to repeated engagement and disengagement of the clutch, a diaphragm spring which is installed between the component and the pressure plate to normally bias the pressure plate toward the clutch disc so that the friction linings are clamped between the two plates, and means for automatically compensating for wear at least upon the friction linings. The compensating means is disposed between the diaphragm spring and the component.

A further feature of the invention resides in the provision of an engageable and disengageable friction clutch which can be utilized with advantage in the power trains of motor vehicles and comprises an axially fixed component (such as the housing or cover of the friction clutch) which is rotatable about a predetermined axis, a pressure plate, means (such as a set of leaf springs) for non-rotatably connecting the pressure plate to the component with freedom of movement in the direction of the predetermined axis, a rotary counter-pressure plate which is adjacent the pressure plate, a torque transmitting clutch disc which is disposed between the two plates and has friction linings subject to wear in response to repeated engagement and disengagement of the clutch, a diaphragm spring which is disposed between the component and the pressure plate to normally (such as when the friction clutch is engaged) bias the pressures plate toward the clutch disc so that the friction linings are clamped between the two plates, and means for automatically compensating for wear at least upon the friction linings. The compensating means comprises concentric adjustable first and second rings which are respectively disposed at first and second radial distances from the predetermined axis and are displaceable in the direction of such axis toward the diaphragm spring, and means for adjusting the rings including first and second displacing units having portions turnable about the predetermined axis and means for turning such portions of the displacing units to thereby displace the respective rings in the direction of the predetermined axis toward the diaphragm spring. The latter includes a portion which is disposed at a first radial distance from the predetermined axis and bears upon one of the rings in the engaged condition of the clutch to thus prevent turning of the aforementioned portion of the respective displacing unit (for the one ring). The compensating means of such friction clutch further comprises a wear detector (e.g., a membrane or a diaphragm spring) having a portion which bears upon the other ring at a second radial distance from the predetermined axis to exert a first force sufficient to prevent turning of the aforementioned portion of the respective displacing unit (namely the displacing unit for the other ring) in the absence of wear upon the friction linings, a lesser second force (e.g., zero force) in response to detected wear in the engaged condition of the clutch to thus permit axial displacement of the other ring through a distance commensurate with the extent of initial wear or uncompensated wear upon the friction linings, and with a third force greater than the second force during disengagement of the clutch. Each of the two displacing units can further comprise at least one first ramp provided on the pressure plate or on the component for each of the two rings, and the aforementioned portions of the displacing units can comprise second ramps provided on the rings and abutting the respective first ramps.

An additional feature of the present invention resides in the provision of an engageable and disengageable friction clutch which can be utilized with particular advantage in power trains between the engines and the wheels of motor vehicles and comprises a housing which is rotatable about a predetermined axis, a pressure plate, means (such as a set of leaf springs) for non-rotatably attaching the pressure plate to the housing with limited freedom of movement in the direction of the predetermined axis, a rotary counterpressure plate which is adjacent and coaxial with the pressure plate, a torque transmitting clutch disc which is disposed between the two plates and has friction linings subject to wear in response to repeated engagement and disengagement of the clutch, a diaphragm spring which is installed between the housing and the pressure plate to normally bias the pressure plate toward the clutch disc so that the friction linings are clamped between the two plates, and means for automatically compensating for wear at least upon the friction linings. The compensating means comprises at least two of the following constituents or features:

(a) First and second rings which are disposed at different radial distances from the predetermined axis and are displaceable in the direction of such axis toward the diaphragm spring, and means for adjusting the rings including first and second displacing units (for example, sets of ramps) as well as means for turning portions of the displacing units to thereby displace the respective rings in the direction of the predetermined axis.

(b) The diaphragm spring includes a portion which is disposed at a given radial distance from the predetermined axis and bears upon one of the rings in the engaged condition of the clutch to thus prevent adjustment of the one ring.

(c) The compensating means comprises a wear detector having a portion bearing upon the other ring at a radial distance from the predetermined axis, other than the given distance, to prevent adjustment of the other ring in the absence of wear upon the friction linings, to permit adjustment of the other ring in response to detection of sufficient wear upon the friction linings with attendant axial displacement of the other ring, and to prevent adjustment of the other ring during disengagement of the clutch.

(d) The compensating means comprises means (e.g., in the form of arms or other abutments on the rings) for blocking adjustment of the one ring except subsequent to adjustment of the other ring when the one ring is adjusted to an extent which is commensurate with (e.g., identical to) adjustment of the other ring.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 2 is an enlarged fragmentary sectional view substantially as seen in the direction of arrows from the line II—II in FIG. 1 and 1a;

FIG. 4 is a view of a detail in FIG. 1, showing the diaphragm spring in a position it assumes when the friction clutch is new and in its engaged condition, the same as in FIG. 1;

FIG. 4a is a sectional view corresponding to that of FIG. 2 and illustrating the rings of the wear compensating unit in their starting positions;

FIG. 5 illustrates the structure of FIG. 4 but with the diaphragm spring in a position it assumes when the new friction clutch is disengaged;

FIG. 5a is a view similar to that of FIG. 4a and showing that the positions of the rings do not change in response to tilting of the diaphragm spring from the position of FIG. 4 to the position of FIG. 5;

FIG. 11 is a fragmentary axial sectional view of a pull-type friction clutch embodying a fourth wear compensating unit;

FIG. 12 is a fragmentary sectional view of the friction clutch of FIG. 11 in a view similar to that of FIG. 2;

FIG. 13 is a fragmentary elevational view of the diaphragm spring and of a wear detector in the friction clutch of FIGS. 11 and 12, substantially as seen from the left-hand side of FIG. 11;

FIG. 16 is a fragmentary elevational view of a diaphragm spring and of a wear detector which can be utilized in lieu of the wear detector in the wear compensating unit of the friction clutch shown in FIGS. 1 to 8a;

FIG. 18 is a diagram showing characteristic curves of the diaphragm spring in the friction clutch of FIGS. 1 to 8a;

FIG. 19 is a diagram showing characteristic curves of a resilient sensor in the wear compensating unit of the friction clutch shown in FIGS. 1 to 8a;

DESCRIPTION OF THE PREFERRED EMBODIMENTS

Figure 1:
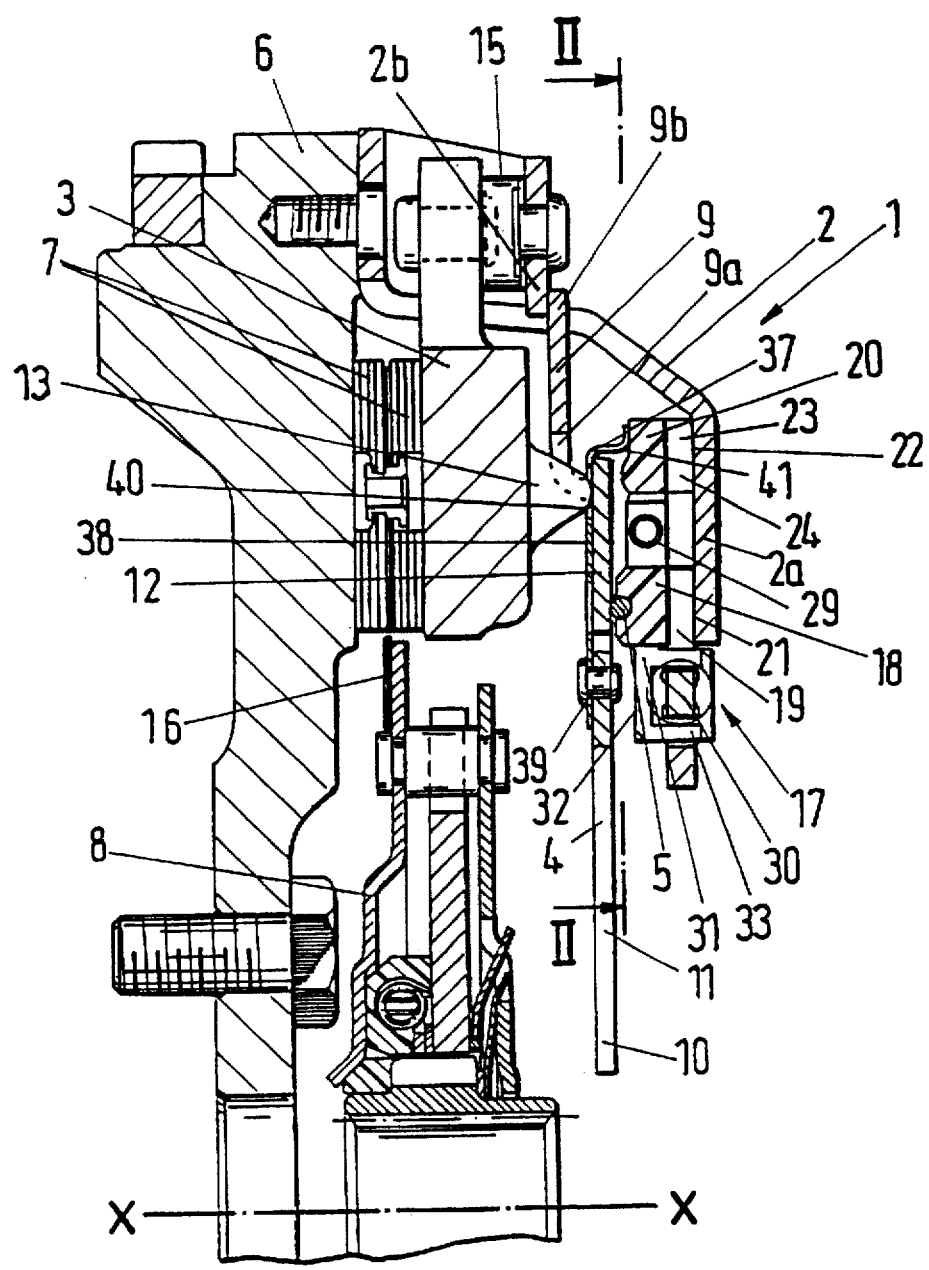
FIG. 1 is a fragmentary axial sectional view of a push-type friction clutch which is equipped with a wear compensating unit embodying one form of the present invention.
Figure 2:
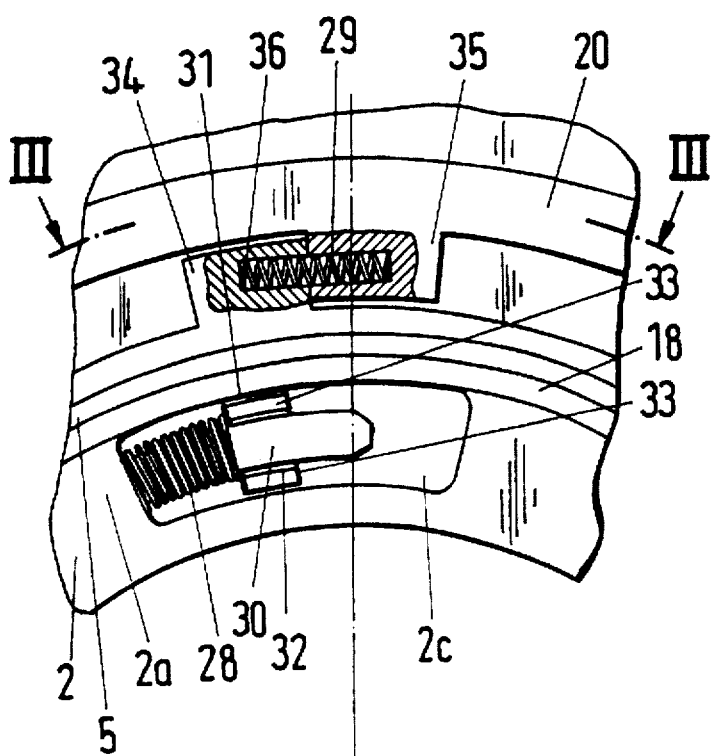
Figure 3:
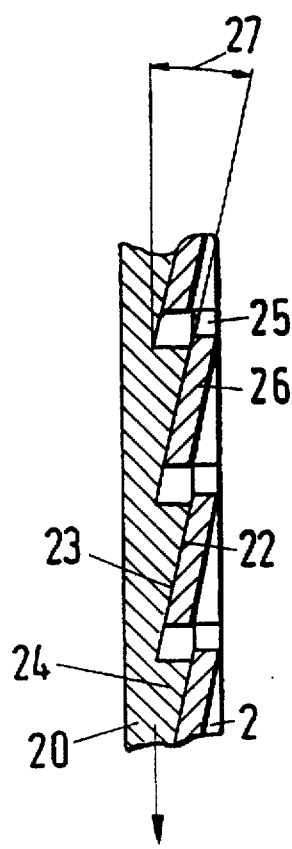
FIG. 3 is a fragmentary sectional view substantially as seen in the direction of arrows from the line III—III in FIG. 2.

Referring first to FIGS. 1 to 3, there is shown a friction clutch 1 which can be utilized in the power train of a motor vehicle to transmit torque from the output element (e.g., a crankshaft) of a combustion engine to the input element (e.g., a shaft) of a variable-speed transmission serving to transmit torque to the front and/or rear wheels of the vehicle. The illustrated friction clutch 1 comprises a housing or cover 2 and a pressure plate 3 which is non-rotatably but axially movably coupled to the housing 2 by a set of resilient elements in the form of leaf springs 15. The extent of axial movability of the pressure plate 3 relative to the housing 2 is limited by the position of a counterpressure plate 6 (e.g., a flywheel which is affixed to the output element of the engine by screws [one shown] or by other suitable fasteners), by the position of a diaphragm spring 4 at the inner side of the bottom wall or end wall 2a of the housing 2, and by the extent (see 43 in FIG. 7) of wear upon the circumferentially complete washer-like radially outer portion 12 of the diaphragm spring 4 as well as by wear upon the pressure plate 3, the counterpressure plate 6 and friction linings 7 of a clutch disc or clutch plate 8 between the plates 3 and 6. The common axis of the plates 3, 6 of the diaphragm spring 4 and of the clutch disc 8 is shown at X—X. The purpose of the central portion or hub of the clutch disc 8 is to transmit torque to the aforementioned input element of the transmission when the friction clutch 1 is engaged, namely when the diaphragm spring 4 is free to bias the left-hand side (friction surface) of the pressure plate 3 against the adjacent set of friction linings 7 and to thereby urge the other set of friction linings 7 against the adjacent side (friction surface) of the counterpressure plate 6 while the latter is driven by the engine.

The housing 2 can be made of a metallic sheet material and is non-rotatably affixed to the counterpressure plate 6 so that the distance between the end wall 2a and the confronting friction surface of the plate 6 remains unchanged. The right-hand side or surface of the pressure plate 3 (as viewed in FIG. 1) is provided with an annulus of projections 13 which are engaged and biased by the radially outer portion 12 of the diaphragm spring 4 when the friction clutch 1 is engaged. The radially inner part of the diaphragm spring portion 12 (i.e., the part which is located radially inwardly of the projections 13 on the pressure plate 3) is engaged by a circular wire-like seat 5 which is partly recessed into a bearing here shown as a ring 18, the purpose of which will be explained hereinafter. It is within the purview of the invention to make the seat 5 of one piece with the ring 18.

The radially inner portion of the diaphragm spring 4 includes a set of substantially radially extending prongs or tongues 11 having free end portions or tips 10 disposed relatively close to the axis X—X and being engageable by a suitable bearing (not shown) or the like to disengage the friction clutch 1 by tilting the illustrated portion of the diaphragm spring 4 relative to the seat 5. At such time, the diaphragm spring 4 acts not unlike a two-armed lever the outer arm of which is pivoted in a direction to the right (as viewed in FIG. 1), i.e., away from the counterpressure plate 6, to permit a movement of the pressure plate 3 axially and away from the counterpressure plate, e.g., under the bias of the leaf springs 15 and/or under the bias of other resilient means, such as a prestressed energy storing device 9. The pressure of the plate 3 upon the adjacent friction linings 7 is then relaxed or terminated so that the plates 3, 6 and the housing 2 as well as the diaphragm spring 4 can turn relative to the clutch disc 8 and its friction linings 7 and/or vice versa.

In order to reengage the friction clutch 1, the diaphragm spring 4 is caused or permitted to reassume the position of FIG. 1 in which its radially outer portion 12 bears against the projections 13 so that the plates 3, 6 are compelled to clamp the friction linings 7 between them, i.e., the clutch disc 8 is compelled to rotate with the counterpressure plate 6.

The illustrated prestressed energy storing device 9 is a diaphragm spring which acts not unlike a sensor (hereinafter called sensor for short) and bears against the left-hand side of the diaphragm spring 4, namely against that side which confronts the pressure plate 3 and faces away from the seat 5 and the end wall 2a of the housing. The sensor 9 is stressed in the direction of the axis X—X by being clamped between the radially outer portion of the housing 2 and the portion 12 of the diaphragm spring 4. The magnitude of the force which the sensor 9 applies to the diaphragm spring 4 is preferably selected in such a way that it exceeds the maximum clutch disengaging force, i.e., the maximum force which is necessary to tilt the diaphragm spring 4 relative to the seat 5 (by exerting a force against the tips 10 of the prongs 11 constituting the radially inner portion of the spring 4) in order to permit rotation of the plates 3, 6 relative to the clutch disc 8 and/or vice versa. The prongs 11 are separated from each other by substantially radially extending slots (see FIG. 13) and their radially outermost parts merge into the washer-like portion 12 of the diaphragm spring 4.

In the friction clutch 1 of FIGS. 1 to 3, the sensor 9 bears against the adjacent side or surface of the circumferentially complete portion 12 of the diaphragm spring 4 at least substantially at the level of engagement between the spring 4 and the projections 13 of the pressure plate 3. In other words, the radial distance of the projections 13 from the axis X—X is at least substantially the same as that between the axis X—X and the location of engagement between the diaphragm spring 4 and the sensor 9. Thus, the sensor 9 (which, as already stated above, constitutes or can constitute a diaphragm spring) applies to the washer-like portion 12 of the diaphragm spring 4 torque in a direction counter to that applied by the portion 12 to the projections 13 of the pressure plate 3 when the friction clutch 1 is engaged. Consequently, the force with which the portion 12 of the diaphragm spring 4 actually bears against the projections 13 of the pressure plate 3 is less than would be the bias of the portion 12 in the absence of the sensor 9. This fact must be taken into consideration in designing the friction clutch, i.e., in selecting the characteristics and mounting of the diaphragm spring 4 and sensor 9, in order to ensure that the bias of the portion 12 upon the projections 13 (as influenced [weakened] by the sensor 9) suffices to ensure that the clutch disc 8 is compelled to rotate with the plates 3, 6 when the friction clutch 1 is engaged and the engine drives the counterpressure plate 6, the pressure plate 3, the housing 2 and the diaphragm spring 4 about their common axis X—X.

That portion of the sensor 9 which biases the diaphragm spring 4 in a direction away from the pressure plate 3 includes a plurality of substantially L-shaped or hook-like tongues 9a which constitute the radially innermost part of the sensor 9 and alternate with the projections 13 as seen in the circumferential direction of the washer-like portion 12. The free end portions or tips of the tongues 9a bear against the adjacent side or surface of the portion 12 to urge such portion toward the end wall 2a of the housing 2.

The sensor 9 is affixed to the housing 2 by a bayonet mount including radially outwardly extending projections 9b on the sensor 9 and complementary projections or abutments 2b on the housing 2 radially outwardly of the end wall 2a and radially inwardly of the locations of connection between the marginal portion of the housing 2 and the counterpressure plate 6. The median portion of the sensor 9 in the friction clutch 1 of FIGS. 1 to 3 resembles a washer having radially inwardly extending arms constituting the tongues 9a and radially outwardly extending arms constituting the projections 9b. The sensor 9 must be turned relative to the housing 2 in order to assemble or disengage the bayonet mount between the projections 9b and the abutments 2b. Such turning of the sensor 9 must be preceded by axial stressing of the sensor so that the projections 9b alternate with the abutments 2b, as seen in the circumferential direction of the housing 2. The housing 2 is thereupon turned relative to the sensor 9 and/or vice versa so that each projection 9b overlies one of the abutments 26. The illustrated abutments 2b can be replaced with stamped portions of the housing 2 without departing from the spirit of the invention. It is also possible to replace the abutments 2b with tongue-like projections which are forced behind the outer marginal portion of the sensor 9 after the latter has been stressed in the axial direction. The same holds true for the aforementioned stamped portions of the housing 2. Still further, it is possible to weld, rivet or otherwise affix to the housing 2 several component parts corresponding to and performing the function of the abutments 2b in order to ensure that the sensor 9 can be installed in an axially stressed condition so as to bear against the diaphragm spring 4, preferably at the level of projections 13 on the pressure plate 3.

Figure 1A:
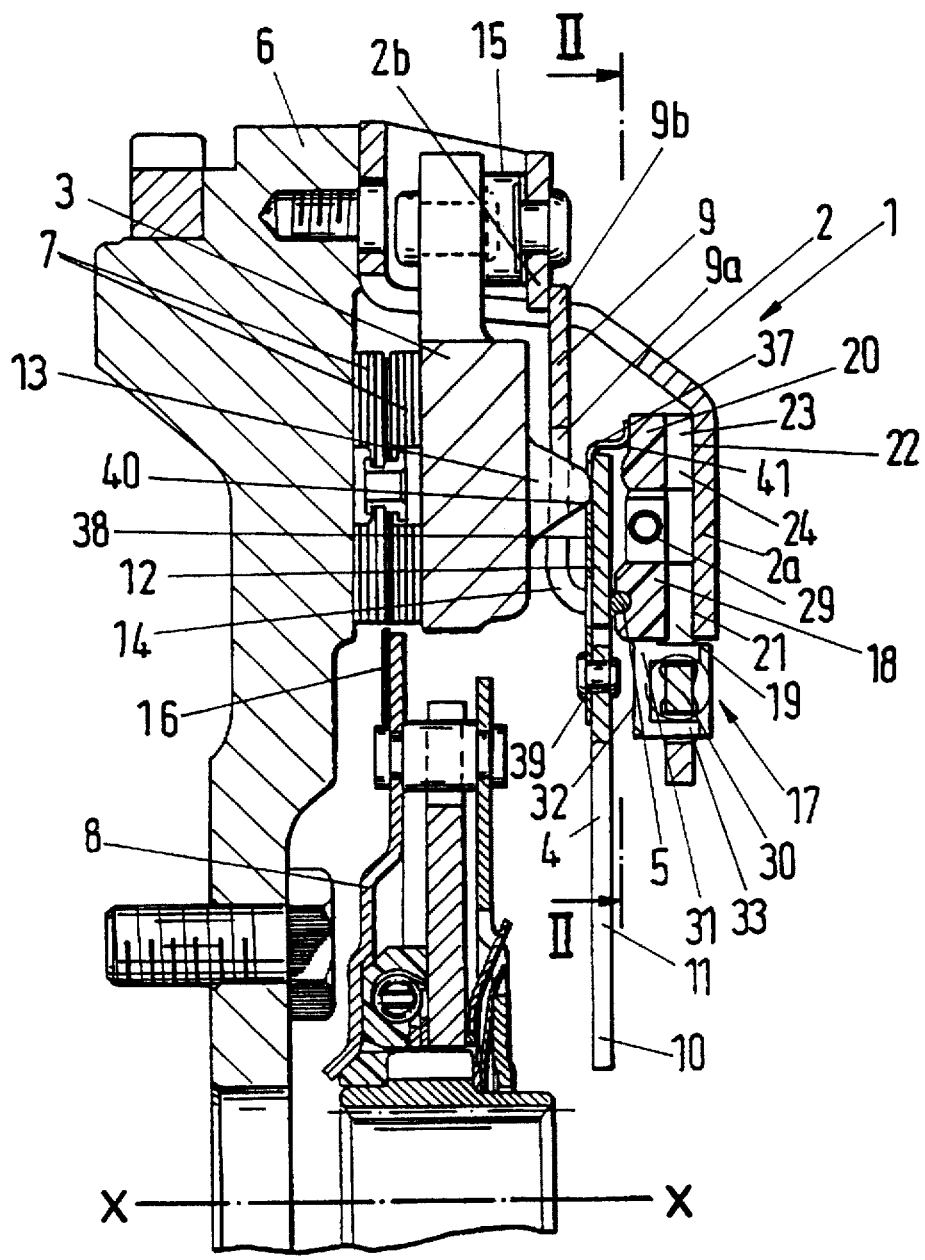
FIG. 1a is similar to FIG. 1 but shows and other embodiment of a biasing element constituting part of the clutch of FIG. 1.

It is equally possible to construct, configure and mount the diaphragm spring 4 and the sensor 9 in such a way that the latter engages the diaphragm spring radially inwardly of the projections 13 on the pressure plate 3. For example, it is often desirable and advantageous to assemble the diaphragm spring 4 and the sensor 9 in such a way that the sensor engages the diaphragm spring at the level of the seat 5; this is indicated in FIG. 1a, as at 14. The parts 14 then replace the tongues 9a of the sensor 9. An advantage of the just described mounting of the sensor 9 and diaphragm spring 4 relative to each other is that the bias of the sensor 9 against the diaphragm spring 4 does not affect the bias of the washer-like portion 12 of the diaphragm spring upon the projections 13 of the pressure plate 3.

The aforementioned leaf springs 15 constitute one presently preferred means for connecting the pressure plate 3 to the housing 2 with no freedom of angular movement but with limited freedom of movement in the directions of the axis X—X. The leaf springs 15 can extend substantially tangentially of the radially outermost portion of the pressure plate 3.

The clutch disc 8 which is shown in FIG. 1 further comprises resilient segments 16 which are interposed between the two sets of friction linings 7 and ensure a progressive buildup or variation of torque during engagement of the friction clutch 1. The purpose of the resilient segments 16 is to yield during engagement of the friction clutch 1, i.e., during axial movement of the pressure plate 3 toward the counterpressure plate 6 because the tips 10 of prongs 11 forming part of the diaphragm spring 4 are caused or permitted to move in a direction to the right toward the position of FIG. 1 in which the washer-like portion 12 of the diaphragm spring bears against the projections 13 of the pressure plate 3 with a force which is determined in part by the initial stressing of the springs 15, by the extent of wear upon the projections 13 and adjacent parts of the washer-like portion 12, by the extent of wear upon the friction surface of the counterpressure plate 6 and by the extent of wear upon the friction linings 7. The arrangement is such that the resilient segments 16 yield during a certain stage of engagement of the friction clutch 1 to thus ensure progressively increasing clamping of the friction linings 7 between the adjacent friction surfaces of the plates 3, 6 while the diaphragm spring 4 is caused or permitted to move the plate 3 axially toward the plate 6. Analogously, the bias upon the friction linings 7 decreases gradually during disengagement of the friction clutch 1 in that the resilient segments 16 are permitted to dissipate energy during a certain stage of movement of the pressure plate 3 axially of and away from the counterpressure plate 6.

It is possible to replace the resilient segments 16 with rigid segments which are affixed to a disc-shaped carrier or holder of the clutch disc 8. It is further possible to omit the segments 16 and to mount the friction linings 7 directly on the holder or carrier of the clutch disc 8.

An important advantage of the resilient sensor 9 is that the diaphragm spring 4 invariably bears against the seat 5 during each and every stage of normal disengagement of the friction clutch 1 as well as during each and every stage of normal tilting of the diaphragm spring 4 relative to the seat 5. Moreover, the sensor 9 ensures that the diaphragm spring 4 bears against the seat 5 with a certain force acting in the direction of the axis X—X.

The sensor 9 is preferably designed in such a way that it furnishes at least a substantially constant force during a certain stage of operation of the friction clutch 1. This sensor takes up, at least substantially, the disengaging force which is applied to the tips 10 forming part of the prongs 11 of the diaphragm spring 4 in a direction to disengage the friction clutch 1, i.e., in a direction to the left as seen in FIG. 1. As used herein, the term "disengaging force" is intended to denote the maximum force which must be applied to the tips 10 of the prongs 11 (or to the disengaging levers, not shown) during actuation of the friction clutch 1 and which must be taken up by the sensor 9. In order to ensure satisfactory operation of the friction clutch 1, the resulting axial force, which is supplied by the sensor 9 and possibly by certain other components (such as, for example, the leaf springs 15) and acts upon the diaphragm spring 4, must exceed the maximum disengaging force, but must also be smaller than the remaining force generated by the diaphragm spring 4 and applied to the projections 13 of the pressure plate 3. On the other hand, the force which is being applied by the sensor 9 must suffice to take up certain undesirable forces, such as forces due to inertia developing as a result of axial vibrations of the pressure plate 3. It is presently preferred to design the sensor 9 in such a way that it applies to the diaphragm spring 4 an axially oriented force which is between 1.1 and 1.4 times the maximum disengaging force.

The seat 5 for the tiltable diaphragm spring 4 is integrated into an automatic wear compensating system or unit 17 which serves to effect axial shifting of the diaphragm spring in a direction toward the counterpressure plate 6 in order to compensate for wear, primarily upon the friction linings 7 but preferably also upon the diaphragm spring 4 and the friction surfaces of the plates 3 and 6. Furthermore, the compensating unit 17 ensures that no undesired clearance or play can develop between the diaphragm spring 4 and the seat 5 and/or between the seat 5 and the housing or cover 2. Such construction and mode of operation of the automatic wear compensating unit 17 prevent the development of undesirable lost motion during actuation of the friction clutch 1. The mode of operation of the wear compensating unit 17 will be described with reference to FIGS. 4 to 8 and 4a to 8a; this unit ensures automatic adjustment of the seat 5 in the direction of the axis X—X in order to compensate for the aforediscussed wear primarily upon the friction linings 7 but preferably also upon the plates 3, 6 and the diaphragm spring 4. The elimination of undesired lost motion ensures optimal operation of the friction clutch 1 in spite of eventual slight or pronounced wear upon the parts 3, 4, 6 and/or 7, as well as an optimal efficiency of the friction clutch.

The wear compensating unit 17 in the friction clutch 1 of the FIGS. 1 to 3 comprises the aforementioned ring-shaped part 18 (hereinafter called ring for short) which constitutes a wear compensating element of the unit 17. That side or surface of the ring 18 which confronts the end wall 2a of the housing 2 is provided with a set of circumferentially extending arcuate wedge-like ramps 19 forming part of a device serving as a means for axially displacing the seat 5 and hence the diaphragm spring 4 in a direction toward the counterpressure plate 6 whenever necessary in order to compensate for wear upon the friction linings 7. The distribution of ramps 19 on the ring 18 is or can be similar to that of ramps 23 at one side (see FIG. 3) of a second ring 20 also forming part of the wear compensating unit 17 and being concentric with and disposed radially outwardly of the ring 18. The ramps 19 and 23 of the respective rings 18, 20 slope axially of the pressure plate 3 in a direction from the right-hand side of the diaphragm spring 4 (as viewed in FIG. 1) toward the inner side of the end wall 2a.

The ring 18 is installed in the friction clutch 1 in such a way that the ramps 19 face the end wall 2a and that the other side of this ring abuts the seat 5. FIG. 1 shows that the left-hand side of the ring 18 is provided with a relatively shallow ring-shaped socket or groove for a portion of the seat 5. As already mentioned hereinbefore, the seat 5 can constitute an integral part of the ring 18; such seat can be a separately produced part which is thereupon bonded to the ring 18 or the seat can be of one piece with the ring 18 (i.e., the seat 5 can be formed simultaneously with and as a result of forming the ring 18).

The ramps 19 of the ring 18 abut complementary ramps 21 which, in the embodiment of FIGS. 1 to 3, are provided directly on the inner side of the end wall 2a of the housing 2. The configuration and distribution of complementary ramps 21 for the ramps 19 of the ring 18 is or can be analogous to that of complementary ramps 22 which are provided on the end wall 2a (see also FIG. 3) and cooperate with the adjacent annulus of ramps 23 at the respective side of the second ring 20 forming part of the automatic wear compensating unit 17. Each of the ramps 19, 21, 22 and 23 can resemble an elongated arcuate wedge or lobe 24 extending circumferentially of the respective ring 18 or 20.

The complementary ramps 21 and 22 can be provided at the inner side of the end wall 2a in a stamping or any other suitable deforming or shaping machine. It is presently preferred to provide the end wall 2a with passages in the form of slots 25 or the like (see the passages 25 between the ramps 22 of the stamped portions 26 of the end wall 2a in FIG. 3) which permit circulation of air when the friction clutch 1 is in use to thus cool the rings 18, 20, the diaphragm spring 4, the seat 5, the pressure plate 3 and the friction linings 7. This prolongs the useful life of the cooled parts and of the entire friction clutch. Similar passages are or can be provided in the end wall 2a between the complementary ramps 21 for the ramps 19 on the ring 18.

As can be seen in FIG. 3, the stamped portions 26 of the end wall 2a are oriented in such a way that (as seen in the direction of rotation of the housing 2 when the friction clutch 1 is in use) the front parts of the stamped portions 26 project axially outwardly beyond the adjacent portions of the end wall 2a and beyond the rear or trailing ends of the respective stamped portions. Thus, the stamped portions 26 act not unlike the blades or vanes of a fran to draw cool atmospheric air into the passages 25 with attendant pronounced cooling of several constituents in actual use of the friction clutch. The numerous streamlets of cool atmospheric air enter the housing 2 through the passages 25 to forcibly cool the adjacent constituents, especially those (such as the friction linings 7) which are subjected to pronounced thermal stresses during certain stages of operation of the friction clutch 1. This prolongs the useful life of the friction linings 7. Adequate cooling of parts in the housing 2 is also important if certain constituents are made of a material which should not be subjected to very pronounced thermal stresses. For example, adequate cooling of the rings 18, 20 renders it possible to make such part of the wear compensating unit 17 from a suitable plastic material (e.g., a heat-resistant or reasonably heat-resistant thermoplastic material). The making of rings 18, 20 from a plastic material is preferred in many instances because this renders it possible to mass-produce these rings in available extruders or like plastic processing machines. However, it is equally within the purview of the invention to make the ring 18 and/or 20 of a metallic sheet material or of a sintered material. Cooling of the rings 18, 20 is particularly desirable and advantageous if such rings are made of a plastic material.

The length (as seen in the circumferential direction of the rings 18, 20) and the slope of the ramps 19, 23 and of the corresponding complementary ramps 21, 22 are selected in such a way that the axial position of the pressure plate 3 can be changed (in a direction toward the counterpressure plate 6) to an extent which is necessary to ensure the possibility of maximum compensation for wear, primarily upon the friction linings 7 but preferably also on the friction surfaces of the plates 3 and 6 and upon the diaphragm spring 4. In other words, the rings 18, 20 should be mounted in such a way that they can turn relative to the end wall 2a of the housing 2 through angles which enable the cooperating ramps 19, 21 and 22, 23 to shift the respective rings 18, 20 axially of the pressure plate 3 toward the counterpressure plate 6 to an extent which ensures adequate operation of the friction clutch 1 even after maximum permissible wear upon several parts including the friction linings 7 (or at least upon such friction linings). Furthermore, the ramps 19, 23 and the complementary ramps 21, 22 must be dimensioned and configured in such a way that they remain in adequate surface-to-surface contact with one another (i.e., the ramps 19 with the adjacent ramps 21 and the ramps 23 with the adjacent ramps 22) when the wear upon the friction linings 7 reaches the maximum permissible value. Such adequate surface-to-surface contact between the cooperating sets of ramps 19, 21 and 22, 23 is necessary in order to ensure that the rings 18, 20 can cooperate with the end wall 2a to take up the axial forces which develop while the friction clutch 1 is in use at a time when the friction linings 7 have undergone a maximum permissible amount of wear. This is particularly important in connection with the ring 18 which is installed to take up the entire bias of the diaphragm spring 4.

It is presently preferred to select the dimensions and the slope of the ramps 19, 21, 22 and 23 in such a way that the rings 18, 20 can turn relative to the housing 2 through angles of between 10 and 90 degrees, preferably between 30 and 80 degrees. The slope (note the angle 27 in FIG. 3) of the ramps is preferably selected in such a way that it is between 4 and 30 degrees, preferably between 4 and 15 degrees. The slope angle 27 which is shown in FIG. 3 is approximately 12 degrees. The arrangement is preferably such that the slope (angle 27) suffices to ensure that, when the ramps 19 and 23 are biased against the respective complementary ramps 21 and 22, the frictional engagement between abutting ramps 19, 21 and 22, 23 suffices to generate friction which prevents slippage between the rings 18, 20 on the one hand and the end wall 2a on the other hand. In other words, when the rings 18 and 20 should not turn relative to the housing 2, friction between the abutting ramps 19, 21 and 22, 23 suffices to establish what can be termed a self-locking action between the rings 18, 20 and the end wall 2a, such locking action being attributable to friction between the ramps 19, 23 and the respective complementary ramps 21, 22.

The slope angle 27 of the ramps 19, 21, 22, 23 is preferably further dependent upon the characteristics of two coil springs 28 and 29 (FIG. 2) the former of which is installed to operate between the housing 2 and the ring 18 and the latter of which is installed to operate between the rings 18, 20. More specifically, the slope angle 27 will be selected by taking into consideration the magnitude of forces which the coil springs 28, 29 apply circumferentially of the end wall 2a against the ring 18 and/or 20. The ring 18 compensates for wear upon the friction linings 7, and the ring 20 acts not unlike a detector which ascertains the need for and/or the extent of axial adjustment of the ring 18 toward the counterpressure plate 6 in order to compensate for the aforediscussed wear. The slope angle of the ramps 19, 21 can, but need not, be the same as the slope angle of the ramps 22, 23. Thus, the slope angle (shown in FIG. 3 at 27) of the ramps 22, 23 between the ring 20 and the end wall 2a can be smaller or larger than the slope angle of the ramps 19 and 21.

The ring 18 is biased in the circumferential direction, namely in a direction in which its ramps 19 must slide along the complementary ramps 21 of the end wall 2a in order to move the ring 28 axially away from the end wall 2a and toward the counterpressure plate 6, i.e., to compensate for wear upon the friction linings 7 (and, if necessary, upon the plates 3, 6 and the diaphragm spring 4). The ring 20 is biased circumferentially in the same direction, i.e., to move away from the end wall 2a and toward the counterpressure plate 6, when it is free to turn about the axis X—X. The biasing or adjusting means for the ring 18 includes the aforementioned coil spring 28. It is clear that the means for turning those portions of the displacing device which include the ramps 19, 23 can include two or more coil springs 28 or analogous springs which can cause the ring 18 to turn about the axis X—X in a direction to ensure that ramps 19, 21 compel it to move axially toward the counterpressure plate 6. The other coil spring 29 of the means for turning the ramps 19, 23 of the displacing device about the axis X—X relative to the ramps 21, 22, respectively, is installed between the rings 18 and 20 in such a way that the two rings operate in series. Thus, the coil spring 29 can serve to change the angular position of the ring 18 as well as the angular position of the ring 20.

The coil spring 28 is mounted on a lug-shaped retainer 30 which is of one piece with the housing 2. If the housing 2 is made of a metallic sheet material, the retainer 30 can constitute a suitably deformed (e.g., partly stamped out) portion of the housing. To this end, the illustrated housing 2 is provided with a substantially U-shaped cutout 2c. The illustrated retainer 30 has an arcuate shape and extends circumferentially or substantially tangentially of the ring 18 and is located at least close to the plane of the adjacent portion of the end wall 2a (i.e., the retainer 30 and the adjacent portion of the end wall 2a are or can be disposed at the same axial distance from the friction surface of the counterpressure plate 6). The width of the retainer 30 is selected in such a way that the convolutions of the spring 28 surrounding the retainer are fixed in the radial and axial directions of the housing 2 and ring 18.

The ring 18 comprises or carries a portion or arm 31 which extends inwardly from the internal surface of this ring and is disposed between the end wall 2a and the diaphragm spring 4 (FIG. 1). The radially innermost portion 32 of the arm 31 is forked or U-shaped and includes two tines or prongs 33 at opposite sides of the retainer 30. The prongs 33 extend in parallel with the axis X—X and through the U-shaped cutout 2c of the end wall 2a. One end convolution of the coil spring 28 bears against the prongs 33 of the arm 31 to bias the ring 18 circumferentially of the end wall 2a in a direction to urge the ramps 19 to slide along the respective complementary ramps 21. When the ramps 19 are free to slide along the adjacent ramps 21 under the bias of the coil spring 28, the resulting movement of the ring 18 has a component in the direction of the axis X—X, namely toward the pressure plate 3. In other words, the rotating or turning ring 18 causes the seat 5 and hence the diaphragm spring 4 to move away from the end wall 2a and toward the plates 3, 6.

The ring 18 is further provided with at least one radially outwardly extending arm 34 which can cooperate with a radially inwardly extending arm 35 of the ring 20 to constitute a barrier or block against rotation of the rings 18, 20 relative to each other. The arm 34 is not located in the path of movement of the arm 35 about the axis X—X when the ring 20 is caused to turn (i.e., when the ramps 23 are caused to slide along the adjacent complementary ramps 22) in a direction to move axially toward the pressure plate 3. The confronting surfaces of the arms 34, 35 are provided with recesses or sockets 36 (FIG. 2) in the form of blind bores or holes which receive portions of the coil spring 29. The latter is installed between the arms 34, 35 in at least slightly stressed condition. When the coil spring 29 is compressed to such an extent that the confronting surfaces of the arms 34, 35 actually abut each other, the ring 18 is compelled to share all further angular movements of the ring 20 in a counterclockwise direction, as viewed in FIG. 2.

The wear compensating unit 17 further comprises a wear detector 37 here shown as a membrane-like spring (and hereinafter called membrane for short). The membrane 37 includes a washer-like portion or section 38 which is resilient and is disposed at the left-hand side of the diaphragm spring 4 (as viewed in FIG. 1). As shown, the portion or section 38 of the membrane 37 can actually abut the respective side of the diaphragm spring 4. This section 38 preferably bears against the diaphragm spring 4 with a predetermined force acting in the direction of the axis X—X so that the washer-like portion 12 of the spring 4 is urged toward the ring 20. The radially inner portion of the section 38 is fixedly connected to the diaphragm spring 4; FIG. 1 shows one of preferably several fasteners in the form of rivets 39 disposed radially inwardly of the ring 18 and coupling the membrane 37 to the radially innermost part of the washer-like portion 12. The rivets 39 constitute but one form of means for fastening the membrane 37 to the diaphragm spring 4; for example, such connection can be replaced with a bayonet mount.

That part of the section 38 of membrane 37 which is disposed at the level of tongues 9a of the sensor 9 (i.e., at the same radial distance from the axis X—X) is provided with cutouts in the form of windows 40 dimensioned to permit passage of the tongues 9a substantially in parallel with the axis X—X. Such configuration of the section 38 ensures that the tongues 9a cannot influence the elastic deformation of the membrane 37. The radially outermost part of the illustrated membrane 37 is provided with substantially axially parallel portions 41 serving as axial abutments for the ring 20. Thus, in order to move axially and away from the end wall 2a, the ring 20 must overcome the resistance of the abutments 41.

The initial bias of the membrane 37 upon the diaphragm spring 4 and the ring 20 is selected in such a way that the ring 20 cannot turn relative to the end wall 2a when the friction clutch 1 is engaged and the wear upon the friction linings 7 is nil (or practically nil) or when the ring 18 undergoes an axial adjustment of the ring 18 to compensate for wear upon the friction linings 7, i.e., when the unit 17 has already compensated for wear upon the friction linings. The bias of the membrane 37 is further selected with a view to take into consideration certain other parameters, such as undesirable forces which are generated (when the friction clutch 1 is in use) by various components of the clutch; these forces can include forces which are attributable to inertia. Thus, biasing of the membrane 37 must be selected with a view to ensure that this membrane can take up axial forces which are generated as a result of axial oscillations, e.g., of the ring 20, without any or without appreciable deformation of the membrane, especially in the engaged condition of the friction clutch 1.

The friction clutch 1 must be assembled in such a way that the membrane 37 cannot be lifted off the ring 20 as a result of wear, especially as a result of wear upon the friction linings 7. Otherwise, the ring 20 would be free to perform certain undesirable angular movements to stress the membrane 37. Such movement of the ring 20 would result in axial adjustment of the diaphragm spring 4, not for the purpose of compensating for wear upon the friction linings 7, but rather for the purpose of ensuring that the membrane 37 is maintained under the requisite tension.

The mode of operation of the friction clutch 1 of FIGS. 1 to 3 will be explained with reference to FIGS. 4 to 8 and 4a to 8a. FIGS. 4 and 4a show certain parts of the friction clutch in positions when the friction clutch is new, i.e., when the wear upon the pressure plate 3, the counterpressure plate 6, the friction linings 7 and the diaphragm spring 4 is nil. The clutch 1 is engaged, i.e., the diaphragm spring 4 is caused or permitted to bear upon the projections of the pressure plate 3 so that the two sets of friction linings 7 are compelled to share the angular movements of the counterpressure plate when the engine (which drives the counterpressure plate) is on. The distance L between the right-hand side of the diaphragm spring 4 (as seen in FIG. 4) and the confronting surface 20a of the ring 20 matches the required distance to be covered by the pressure plate 3 in a direction away from the counterpressure plate in order to disengage the friction clutch 1. The membrane 37 abuts the left-hand side of the diaphragm spring 4 (as viewed in FIG. 4) and the left-hand side of the ring 20 to prevent rotation of this ring, i.e., the wear compensating unit is inactive. The washer-like portion of the diaphragm spring 4 bears against the seat 5 and thus prevents rotation of the ring 18 about the axis X—X, i.e., the axial position of the diaphragm spring 4 cannot be changed.

FIG. 4a shows that the arms 34, 35 of the rings 18, 20 abut each other, i.e., the coil spring 29 stores energy and the ring 20 (whose rotation is blocked by the membrane) holds the ring 18 against rotation in a direction to move the diaphragm spring 4 toward the pressure plate 3. The coil spring 28 serves as a means for maintaining the coil spring 29 in fully compressed (stressed) condition as shown in FIG. 4a. During the entire useful life of the friction clutch 1, the force of the spring 28 must exceed the bias of the spring 29 in the compressed condition of the spring 29 as shown in FIG. 4a. This holds true for the entire range of angular adjustments of the ring 18, i.e., for the entire range of axial movements of the diaphragm spring 4 away from the end wall of the housing 2 in order to compensate for wear upon the friction linings 7 and preferably also upon the parts 3, 4 and 6.

When the friction clutch 1 is in the process of being disengaged, the diaphragm spring 4 is tilted from the angular position of FIG. 4 toward the angular position of FIG. 5 When it reaches the angular position of FIG. 5, the tip 10 of the illustrated prong of the diaphragm spring 4 has been tilted (about the fulcrum defined by the seat 5) through a distance X. At such time, the radially outermost part of the washer-like portion of the diaphragm spring 4 reaches and abuts the surface 20a of the ring 20. Such tilting of the diaphragm spring 4 has resulted in axial movement of the pressure plate 3 through the distance L1 because the pressure plate 3 is biased away from the counterpressure plate 6 by the leaf springs 15 (FIG. 1). The distance L1 between the zero (0) or starting axial position of the pressure plate 3 of FIG. 4 and the axial position of FIG. 5 suffices to ensure a relaxation of the pressure from the friction surfaces of plates 3, 6 against the adjacent sets of friction linings 7. Axial movement of the pressure plate 3 from the 0-position of FIG. 4 through the distance L1 to the axial position of FIG. 5 results in axial stressing of the membrane 37. Accordingly, the radially outermost portion 41 of the membrane 37 bears upon the ring 20 with a greater force and prevents the ring 20 from turning, i.e., the wear compensating unit remains inactive during that stage of disengagement of the friction clutch 1 which involves tilting of the diaphragm spring 4 from the position of FIG. 4 to the position of FIG. 5. This is desirable and advantageous because the ring 20 is even more reliably prevented from turning or permitting a turning of the ring 18, i.e., from changing the axial position of the seat 5, and hence of the diaphragm spring 4, relative to the end wall of the housing 2. A comparison of FIGS. 4a and 5a shows that the angular positions of the rings 18 and 20 relative to each other and relative to the end wall of the housing 2 remain unchanged while the diaphragm spring 4 is being tilted from the position of FIG. 4 to the position of FIG. 5.

The distance X which is covered by the tips 10 of prongs forming part of the diaphragm spring 4 during tilting of the latter from the position of FIG. 4 to the position of FIG. 5 is the minimum distance required to ensure that the pressure plate 3 is moved by the leaf springs 15 axially through the distance L1 in a direction away from the counterpressure plate. This minimum distance X must be covered by the tips 10 before the wear compensating unit is capable of moving the seat 5 in a direction away from the end wall of the housing 2.

Figure 6:
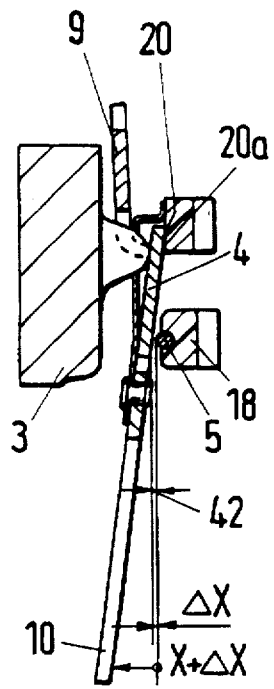
FIG. 6 is a view similar to that of FIG. 5 but with the diaphragm spring in a position subsequent to tilting beyond the position of FIG. 5.
Figure 6A:
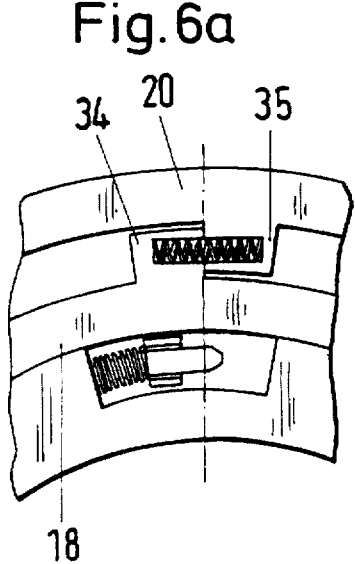
FIG. 6a is a view similar to that of FIG. 4a or 5a and showing that the positions of the rings do not change in response to tilting of the diaphragm spring to the position of FIG. 6.

In order to achieve the required minimum axial movement of the pressure plate 3 away from the 0-position of FIG. 4, it is normally preferred to ensure that the tips 10 of the prongs on the diaphragm spring 4 cover a distance which at least slightly exceeds the distance X shown in FIG. 5. This can be seen in FIG. 6 wherein the additional distance ΔX is desirable in order to account for tolerances and vibrations. As also shown in FIG. 6, a movement of the tips 10 beyond the distance X (such as through the additional distance ΔX) causes the diaphragm spring 4 to begin to act not unlike a one-armed lever in that the radially outermost part of the washer-like portion of the diaphragm spring 4 begins to pivot at the surface 20a of the ring 20, whereby the radially inner part of the washer-like portion of the diaphragm spring moves toward the pressure plate 3 and away from the seat 5. The normally small or very small clearance between the right-hand side of the washer-like portion of the diaphragm spring 4 and the seat 5 is shown in FIG. 6, as at 42. Thus, the diaphragm spring 4 no longer causes the seat 5 to bear against the ring 18. Nevertheless, the ring 18 is still held against rotation under the bias of the coil spring 28 because the washer-like portion of the diaphragm spring 4 bears against the surface 20a of the ring 20, i.e., the latter is held against rotation relative to the end wall of the housing 2. As shown in FIG. 6a, the arms 34, 35 of the rings 18, 20 continue to abut each other and, since the ring 20 is held against rotation by the washer-like portion of the diaphragm spring 4 as well as by the membrane 37, the coil spring 28 is incapable of turning the ring 18 in a direction which would enable the cooperating ramps 19 and 21 to shift the seat 5 axially and away from the end wall of the housing 2. The bias of the washer-like portion of the diaphragm spring 4 upon the ring 20 is assisted by the bias of the sensor 9 whose tongues bear against the adjacent side of the washer-like portion. A comparison of FIGS. 4, 5 and 6 will show that the change in conicity of the diaphragm spring 4 as a result of movement of the tips 10 through the distance X or X+ΔX entails a change of conicity of the sensor 9 because the illustrated sensor also constitutes a diaphragm spring which is fulcrumed at 2b, 9b.

If certain parts of the friction clutch 1 (particularly the friction linings 7) have undergone a given amount of wear as a result of previous engagement of the friction clutch, there results an axial movement of the pressure plate 3 through the distance L1 (FIG. 5) plus a distance 43 (shown in FIG. 7), i.e., the friction surface of the pressure plate 3 moves nearer to the friction surface of the counterpressure plate than in response to engagement of the friction clutch when the friction linings are new. Thus, the distance 43 indicates that extent of wear upon the friction linings 7. As mentioned above, the unit 17 can also compensate for wear upon certain parts other than the friction linings 7, such as the plates 3, 6 and the diaphragm spring 4. However, and since the wear upon the parts 3, 4 and 6 is normally less than the wear upon the friction linings 7, the following part of the description of the mode of operation of the wear compensating unit will refer only to the wear upon the friction linings.

Figure 7:
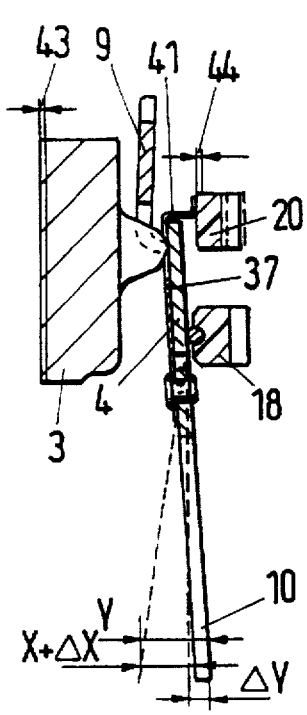
FIG. 7 is a view similar to that of FIG. 4 but showing the diaphragm spring in a position tilted back beyond the position of FIG. 4.
Figure 8:
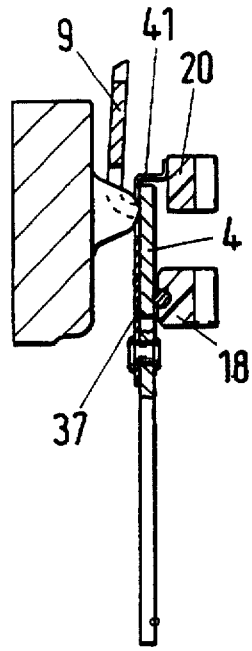
FIG. 8 is a view similar to that of FIG. 7 but showing the diaphragm spring in a position corresponding to reengaged condition of the friction clutch upon completed adjustment of the pressure plate to compensate for wear upon the friction linings.
Figure 7A:
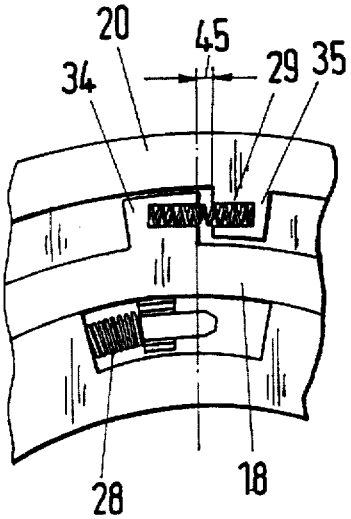
FIG. 7a is a view similar to that of FIG. 6a but showing one of the two rings in a different position subsequent to an angular adjustment to compensate for wear upon the friction linings of the clutch disc.
Figure 8A:
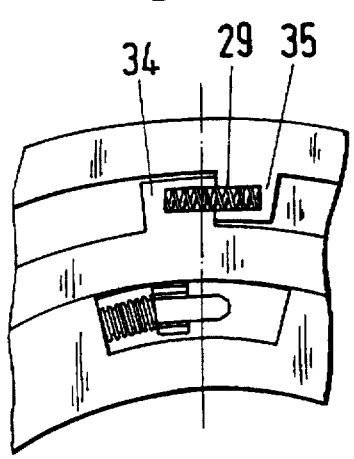
FIG. 8a is a view similar to that of FIG. 7a but further showing the other ring of the wear compensating unit in a different angular position in which the pressure plate is maintained in the axial position of FIG. 8.

As the pressure plate 3 moves through the distance L1 plus the distance 43, the conicity of the diaphragm spring 4 changes (together with the conicity of the sensor 9) from that shown in FIG. 4 to that which is shown in FIG. 7, i.e., reengagement of the friction clutch 1 entails a different conicity of the diaphragm spring 4 and of the sensor 9 as a result of wear upon the friction linings 7. The change of conicity of diaphragm spring 4 results in a rightward movement of the tips 10 beyond the positions of FIG. 4, namely through a distance ΔY which is shown in FIG. 7. At the same time, the change of conicity of the sensor 9 entails a leftward movement of the abutment or abutments 41 of the wear detector 37 in a direction to the left through a distance 44 (also shown in FIG. 7). Thus, the abutment or abutments 41 cease to bear upon the ring 20 which is thus free to turn under the bias of the coil spring 29 (see FIG. 7a). Consequently, the arm 35 moves away from the arm 34 through a distance 45 which is shown in FIG. 7a. Such a distance 45 indicates the width of the space between the confronting surfaces of the arms 34 and 35, i.e., the extent of dissipation of energy by the spring 29. As the ring 20 turns under the bias of the spring 29, its ramps 23 slide along the adjacent complementary ramps 22 of the end wall of the housing 2 so that the ring 20 moves axially away from such end wall until arrested by the abutment or abutments 41 of the wear detector 37. In other words, the ring 20 cannot turn any further when the bias of the spring 29 no longer suffices to turn the ramps 23 along the respective ramps 22 against the opposition of the abutment or abutments 41 forming part of the wear detector 37. The distance or width 45 is related to the aforementioned distance 44, i.e., the distance 44 is reduced to zero when the spring 29 is no longer capable of moving the ramps 23 of the ring 20 along the adjacent complementary ramps 22 of the end wall 2a. More specifically, the distance or width 45 equals the distance 44 (the extent of axial movement of the ring 20) to compensate for wear (see 43) upon the friction linings 7 divided by the tangent of the angle 27 denoting the slope of the ramps 22 and 23.

The just described compensation for wear (43) upon the friction linings 7 necessitates a larger movement of the tips 10 of the prongs forming part of the diaphragm spring 4 toward the positions in which the friction clutch 1 is again engaged. Thus, when compared with the movement (X+ΔX) of the tips 10 in a direction to disengage the friction clutch 1, the movement of such tips 10 to positions in which the friction clutch 1 is again engaged must be increased by ΔY and equals Y+ΔY (see FIG. 7).

When the renewed engagement of the friction clutch 1, in a manner as described with reference to FIG. 7, is followed by a disengagement (FIG. 8), the bias of the diaphragm spring 4 upon the seat 5 (and hence upon the ring 18) is relaxed in a manner as described with reference to FIG. 6 so that the ring 18 is free to turn relative to the end wall of the housing 2 and relative to the ring 20 due to the presence of the space 45 (FIG. 7a), i.e., the spring 28 is free to dissipate energy until the arm 34 of the ring 18 returns into abutment with the arm 35 of the ring 20 (see FIG. 8A) whereby the ramps 19 slide along the complementary ramps 21 of the end wall 2a and cause the seat 5 to move axially toward the pressure plate 3. As already mentioned above, the bias of the spring 28 is greater than the bias of the spring 29, even in fully compressed condition of the spring 29 (in which the arms 34 and 35 abut each other), so that the spring 28 reduces the width of the space 45 to zero to thus ensure that axial shifting of the seat 5 toward the counterpressure plate suffices to compensate for wear upon the friction lining 7. When the axial adjustment of the seat 5 in a direction toward the counterpressure plate (to compensate for wear upon the friction lining 7) is completed, the axial position of the seat 5 is such that the conicity of the diaphragm spring 4 again corresponds (at least substantially) to that shown in FIG. 4, i.e., the conicity is the same as when the friction linings 7 were still intact. However, the conicity of the sensor 9 is changed. The rings 18 and 20 then assume different angular positions (compare FIGS. 4a and 8a) because these rings were turned in the aforedescribed manner in order to compensate for wear upon the friction linings 7.

In actual practice, the adjustments of the rings 18 and 20 in the direction of the axis X—X (in order to compensate for wear upon the friction linings 7) are small or extremely small. As a rule, the axial position of the seat 5 is adjusted many times; in fact, the adjustments can be practically continuous in response to each disengagement and reengagement of the friction clutch 1 or upon completion of relatively small numbers of successive engagements and disengagements, depending upon the sensitivity of the wear compensating unit 17 and upon the extent of wear upon the friction linings. The extent of axial adjustment of the seat 5 (i.e., the width of the space 45 shown in FIG. 7a) is normally very small but such adjustment takes place many times. The width of the space 45 has been exaggerated in FIG. 7a for the sake of clarity.

The diaphragm spring 4 acts not unlike a two-armed lever during tilting of its tips 10 through the distance X (FIGS. 5 and 6) as long as it is fulcrumed at 5. However, once the radially outermost part of the washer-like portion of the diaphragm spring 4 reaches and is fulcrumed at the surface 20a of the ring 20, the diaphragm spring 4 acts as a one-armed lever. Thus, the diaphragm spring 4 acts as a two-armed lever as long as its washer-like portion contacts and is tilted relative to the seat 5, but the diaphragm spring 4 begins to act as a one-armed lever when its washer-like portion comes into contact with and is tilted relative to the surface 20a of the ring 20. This results in a change of the transmission ratio of the diaphragm spring 4 in the friction clutch 1 from i to i+1 wherein i denotes the ratio of the distance of the seat 5 from the locus (tips 10) where the disengaging lever(s) or bearing applies force to the diaphragm spring 4 in order to tilt it in the housing 2 to the distance of the seat 5 from the locus of contact (at projections 13) between the diaphragm spring and the pressure plate 3. It is assumed that the region of contact between the diaphragm spring 4 and the surface 20a of the ring 20 is located (at least substantially) at the same radial distance from the axis X—X as the region of contact (projections 13) between the diaphragm spring and the pressure plate 3. Due to the fact that the transmission ratio is increased from i to i+1, the force-to-distance characteristic of the diaphragm spring 4 can be extended. Otherwise stated, if the transmission ratio is increased, the magnitude of the force (or the extent of change of such force) can be reduced, i.e., the aforementioned force-to-distance ratio is flatter or smoother. This renders it possible to reduce the magnitude of the disengaging force during the respective stage of disengagement of the friction clutch 1.

As already mentioned hereinbefore, it is advisable to provide the friction clutch 1 with means for ensuring a gradual reduction of torque which can be transmitted during disengagement of the friction clutch. This renders it possible to reduce or minimize the progress of the disengaging force, namely the maximum force which is necessary to disengage the friction clutch. Such means for ensuring a gradual reduction of torque which is transmitted during disengagement of the friction clutch 1 includes or is constituted by the resilient segments 16 which carry the two sets of friction linings 7 and form part of the clutch disc 8. Suitable resilient segments are described and shown, for example, in published German patent application Ser. No. 36 31 863 to which reference may be had, if necessary.

Another mode of ensuring a progressive reduction of torque as well as a progressive increase of torque during disengagement and engagement of a friction clutch is disclosed in British Patent Specification No. 1 261,649. This publication proposes to employ a composite flywheel including two discrete flywheels. That discrete flywheel which constitutes the counterpressure plate is axially movably connected to the other discrete flywheel, which latter is driven by the output element of a combustion engine or another prime mover. The component which constitutes the counterpressure plate is biased in the axial direction away from the other discrete flywheel.

It is further possible to replace the resilient segments 16 for the friction linings 7 with means for effecting gradual reduction of torque in the power flow between the diaphragm spring 4 and the pressure plate 3. Reference may be had, for example, to U.S. Pat. Nos. 4,828,083 and 3,323,624. Still further, it is possible to replace the resilient segments 16 with means for effecting a gradual reduction of torque in the power flow between the diaphragm spring 4 and the locations where the housing or cover 2 is secured to the counterpressure plate 6.

Irrespective of the exact nature of the means for effecting a gradual reduction of torque during engagement or disengagement of the improved friction clutch, it is necessary to connect such means (for example, the resilient segments 16) in series with the diaphragm spring 4. In other words, the just discussed means (hereinafter referred to as the resilient segments 16 with the understanding, however, that these segments can be replaced by or used jointly with the aforementioned alternative embodiments of such means) must be capable of undergoing resilient deformation in response to the application of force by the diaphragm spring 4.

The purpose and mode of operation of the resilient segments 16 (as a means for effecting a gradual reduction of torque which is being transmitted during engagement or disengagement of the friction clutch) will be more readily appreciated upon perusal of the following detailed description of the diagrams which are shown in FIGS. 18 and 19. The distances (in millimeters) are measured along the abscissa and the magnitude of the force (N) is measured along the ordinate.

The curve 50 in the diagram of FIG. 18 is a characteristic curve denoting the progress of axial forces which are being applied by the diaphragm spring 4 to the pressure plate 3 during a certain stage of operation of the friction clutch 1 and vary due to changes of conicity of the diaphragm spring. The aforementioned stage includes axial deformation of the washer-like circumferentially complete portion 12 of the diaphragm spring 4 between the seat 5 and the loci of contact between the projections 13 of the pressure plate 3 and the diaphragm spring radially outwardly of the seat 5. The curve 50 is plotted by taking into consideration the influence of the force or forces exerted upon the diaphragm spring by the sensor 9 and possibly other parts (such as the leaf springs 15), namely the force or forces which assist or oppose (i.e., influence) the bias of the diaphragm spring upon the pressure plate. The actual relationship between the force of the diaphragm spring 4 and the distance which is covered by the washer-like portion 12 is indicated in FIG. 18 by a broken-line curve 50a. In other words, the force-distance relationship pertaining to the diaphragm spring 4 is actually higher than that indicated by the solid-line curve 50 of FIG. 18.

The point 51 on the curve 50 denotes the position of the diaphragm spring 4 upon installation in a new friction clutch 1 (i.e., the wear upon the friction linings 7, upon the friction surfaces of the plates 3, 6 and upon the diaphragm spring is assumed to be zero). At such time, the diaphragm spring 4 applies to the pressure plate 3 a force of maximum magnitude. The point 51 can be shifted along the curve 50, either toward or away from the abscissa, by an appropriate change of conicity during installation of the diaphragm spring 4 between the end wall 2a of the housing 2 and the pressure plate 3.

The curve 52 denotes in FIG. 18 the progress of the spreading force which is being applied by the resilient segments 16 to move the two sets of friction linings 7 axially of the plates 3, 6 and away from each other. Such a force is applied to the pressure plate 3 by way of the right-hand set of friction linings 7, as viewed in FIG. 1. It will be seen that the force which is being applied by the resilient segments 16 (as indicated by the curve 52) opposes the bias of the diaphragm spring 4 upon the pressure plate 3 in a direction to move the pressure plate toward the counterpressure plate 6, i.e., to deform (flatten) the segments 16 and to thus move the two sets of friction linings 7 axially of the two plates and toward each other.

It is normally desirable that the maximum force which is being applied by the segments 16 and is denoted by the curve 52 of FIG. 18 at least match the maximum force which the diaphragm spring 4 can apply to the pressure plate 3. Thus, when the friction clutch 1 is fully engaged, deformation of the segments 16 is not completed, i.e., these segments are capable of some additional deformation or flattening so that they exhibit a certain spare resiliency or additional surplus resiliency due to the fact that the maximum bias of the segments 16 at least matches, but preferably at least slightly exceeds, the maximum bias of the diaphragm spring 4 upon the pressure plate 3. The segments 16 dissipate energy during disengagement of the friction clutch, and the extent of expansion of the segments 16 during such disengagement (i.e., the extent of movement of the two sets of friction linings 7 axially of the plates 3, 6 and away from each other) is shown in FIG. 18, as at 53. The segments 16 thus assist the leaf springs 15 in effecting a disengagement of the friction clutch 1 when the diaphragm spring 4 is tilted from the position of FIG. 4 to the position of FIG. 5. It will be noted that the segments 16 ensure that disengagement of the friction clutch 1 necessitates the application of a lesser force than that which would be required in the absence of such segments and when the position of the diaphragm spring 4 corresponds to that indicated by the point 51 on the curve 50 of FIG. 18.

The point 54 on the curve 50 in the diagram of FIG. 18 denotes the condition or shape of the diaphragm spring 4 just before the friction surfaces of the plates 3, 6 release the adjacent sets of friction linings 7, i.e., just before the friction clutch 1 becomes disengaged. Otherwise stated, the position of the diaphragm spring 4 must be changed beyond that denoted by the point 54 (in a direction away from the ordinate in the diagram of FIG. 18) in order to ensure a disengagement of the friction surfaces forming part of the plates 3, 6 from the adjacent sets of friction linings 7. In view of the digressive characteristic of the curve 50 denoting the position of the diaphragm spring 4, the magnitude of the disengaging force is considerably less than that corresponding to the point 51 on the curve 50. The disengaging force for the friction clutch 1 decreases all the way to the lowest point 55 of the curve 50. If the deformation of the diaphragm spring 4 is continued beyond the point 55, the required disengaging force begins to rise but the extent of movement of the tips 10 of prongs 11 forming part of the diaphragm spring 4 is preferably selected in such a way that the magnitude of the disengaging force is not greater than the bias of the sensor 9, even if the disengagement proceeds beyond the lowermost point 55 of the curve 50. This is desirable and necessary because, otherwise, the wear detector 37 would no longer contact the ring 20 during disengagement of the friction clutch 1 and the wear compensating unit would effect an unnecessary angular adjustment of the ring 18 at a time when the extent of wear upon the friction linings 7 does not warrant such adjustment. The just discussed adjustment of the ring 18 due to disengagement of the wear detector 37 from the ring 20 would prevent full disengagement of the friction clutch 1. In fact, under extreme circumstances, the friction clutch 1 would no longer be capable of disengagement, i.e., the friction clutch would no longer permit an interruption of power flow between the plates 3, 6 and the clutch disc 8 (namely between the output element of the engine which drives the counterpressure plate 6 and the input element of the transmission which receives torque from the hub of the clutch disc 8.

The distance-to-force ratio of the sensor 9 is denoted by the curve 57 in the diagram of FIG. 19. The curve 57 represents the progress of the aforementioned ratio when the unstressed sensor 9 (the sensor 9 in the friction clutch 1 is a diaphragm spring) is caused to store energy and thus changes its conicity between two abutments which are separated from each other by a distance (as measured radially of the axis X—X) corresponding to that between the abutment on the housing 2 and the abutment on the diaphragm spring 4. The curve 57 includes a portion 58 which is the range of travel or excursion of the sensor 9. It will be noted that the axial force of the sensor 9 within the range 58 is nearly constant. The force within the range 58 can be selected in such a way that it always exceeds the maximum disengaging force at the tips 10 of the diaphragm spring 4 during the entire useful life of the friction clutch. The force which is to be applied by the sensor 9 depends upon the transmission ratio (lever arm) of the diaphragm spring 4. In most instances, such transmission ratio is normally within the range of 1 to 3 and 1 to 5 but, under certain circumstances, can be higher or lower. Such transmission ratio corresponds to the ratio of the radial distances of the seat 5 from the locations of contact between the spring 4 and sensor 9 to the radial distance of the seat 5 from the locations of contact between the disengaging means (e.g., a bearing) and the tips 10 of prongs 11 forming part of the diaphragm spring 4.

The mounting of the sensor 9 in the friction clutch 1 is selected in such a way that the sensor can resile during disengagement and also moves axially in a direction toward the friction linings 7 through a distance at least approximating the distance which is covered by the pressure plate 3 in a direction toward the counterpressure plate 6 in order to compensate for wear upon the friction linings 7 (and preferably also upon the friction surfaces of the plates 3 and 6). It is desirable that, during movement of the sensor 9 through such distance, the magnitude of axial force which is being applied by the sensor 9 to the diaphragm spring 4 exceed the force which must be applied to disengage the friction clutch 1. It is often advantageous and desirable to select the portion 58 of the curve 57 in the diagram of FIG. 19 in such a way that it corresponds to, but preferably exceeds, the maximum distance which is covered as a result of wear. This ensures that one can compensate, at least in part, for tolerances during assembly of the friction clutch 1.

If the friction clutch 1 is equipped with one or more prestressed sensors 9 which urge the pressure plate 3 axially and away from the counterpressure plate 6, the sensor or sensors 9 urge the pressure plate toward the diaphragm spring 4 so that (and as already mentioned hereinbefore) the sensor or sensors can assist in disengagement of the friction clutch. The axially oriented force which is applied by the sensor or sensors 9 is superimposed upon the axially oriented force which is applied by the diaphragm spring 4. Thus, the sensor or sensors 9 can be installed between the end wall 2a of the housing 2 and the pressure plate 3 in such a way that, as the wear upon the friction linings 7 increases, the bias of the sensor or sensors 9 upon the diaphragm spring 4 also increases.

The curve 57b indicates in the diagram of FIG. 19 the axially oriented force which is applied by the leaf springs 15 while the force-to-distance ratio of the sensor or sensors 9 varies as indicated by the portion 58 of the curve 57, i.e., within the entire range of wear compensating adjustments by the unit 17. As the wear upon the friction linings 7 increases, the restoring force of the leaf springs 15 (to urge the pressure plate 3 away from the counterpressure plate 6 and to thus oppose the bias of the diaphragm spring 4) also increases. If it is desired that the distance-to-force ratio of the sensor or sensors 9 correspond to that denoted by the curve 57 in the diagram of FIG. 19, the sensor or sensors 9 must be designed in such a way that the actual ratio is the one denoted by the broken-line curve 57c.

It is also within the purview of the invention to design the means (such as the sensor or sensors 9) which bias the diaphragm spring 4 against the seat 5 in such a way that the characteristic curve of such biasing means departs from those shown in FIG. 19. For example, the portion 58 of the curve 57 can exhibit a progressive or digressive characteristic (rather than being at a substantially constant distance from the abscissa). All that counts is to ensure that the resultant force which is being applied by the sensor or sensors 9 (and under certain circumstances by one or more additional force applying means such as, for example, the leaf springs 15) to the diaphragm spring 4 is greater than the required disengaging force for the friction clutch 1 (such disengaging force acts counter to the aforementioned resultant forces).

To summarize the function and the mode of operation of the wear detector 37: This component part of the compensating unit 17 can be deactivated, or its effect upon the ring 20 at least reduced, in dependency on a change of conicity of the diaphragm spring 4 (due to wear upon the friction linings 7) and/or in dependency on the positions and/or dimensions and/or other characteristics of the clutch engaging and disengaging means (normally including or acting upon the tips 10 of the prongs 11 forming part of the diaphragm spring 4) and/or in dependency on changes of the axial position of the pressure plate 3 in response to wear upon the friction linings 7. The wear detector 37 can be characterized as a brake whose braking or blocking action increases in dependency on the extent of disengagement of the friction clutch 1. The wear detector 37 permits an angular adjustment of the ring 20 in the direction of the axis X—X in the engaged condition of the friction clutch 1 (i.e., the ring 20 is free to turn about the axis X—X when the clutch is engaged) to an extent which is determined by the change of conicity of the diaphragm spring 4 (and/or of the position of its tips 10) due to wear upon the friction linings 7 or by the change of axial position of the pressure plate 3 (again as a result of wear upon the friction linings). The wear detector 37 can comprise a single resilient portion or section 38 or two or more discrete resilient sections—this will be described with reference to FIGS. 16 and 17—which can yield in the direction of the axis X—X. The section or sections 38 of the wear detector 37 react against the cover or housing 2, against the pressure plate 3 or against the diaphragm spring 4 so that the wear detector 27 bears against the ring 20 with a force which is sufficient to prevent an angular displacement (and hence an axial movement toward the diaphragm spring) under the action of the coil spring 28 and/or 29 except when the conicity of the diaphragm spring 4 has been changed and/or the axial position of the pressure plate 3 has been changed as a result of wear upon the friction linings 7. Thus, the wear detector 37 prevents the ring 20 from turning when the engaged friction clutch 1 is new (i.e., when the friction linings 7 are still devoid of wear) and/or when the axial position of the ring 20 has already been changed due to wear upon the friction linings and no additional wear (or no appreciable additional wear) upon the friction linings has taken place. The situation is entirely different when the friction clutch 1 requires adjustment to compensate for wear; the braking action of the wear detector 37 is then reduced or interrupted (i.e., reduced to zero) due to a change of the axial position of the pressure plate 3 while the clutch is engaged so that the coil spring 28 and/or 29 is free to change the angular (and hence the axial) position of the ring 20 preparatory to a commensurate change of angular and axial positions of the ring 18.

As can be seen, for example, in FIG. 5, the ring 20 is blocked against angular movement in response to disengagement of the friction clutch 1 because this ring is then urged against the end wall 2a of the housing 2 by the radially outermost part of the diaphragm spring 4 as well as by the abutment or abutments 41 of the wear detector 37.

The ramps 19 and 23 of the rings 18 and 20 resemble portions of a roof and slope toward the pressure plate 3 in order to permit angular and axial movements of these rings (downwardly as shown for the ring 20 in FIG. 3) when the rings are to compensate for wear upon the friction linings 7. The passages 25 are provided in the end wall 2a adjacent those portions of the ramps 23 shown in FIG. 3 which are nearest to such end wall, i.e., remotest from the pressure plate 3.

Figure 9:
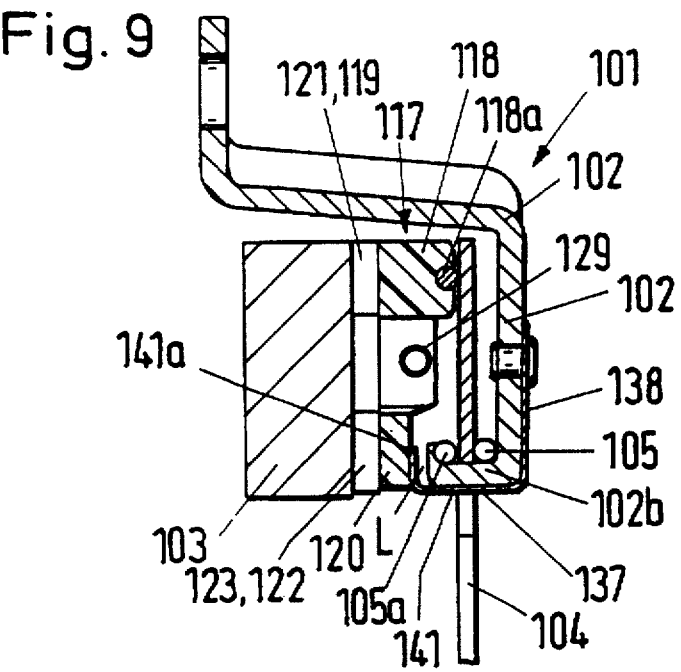
FIG. 9 is a fragmentary axial sectional view of a push-type friction clutch which embodies a modified wear compensating unit.

FIG. 9 illustrates a portion of a modified friction clutch 101 which is also a push-type clutch, the same as the friction clutch 1 of FIGS. 1 to 8a. In other words, the tips of the radially inwardly extending prongs of the diaphragm spring 104 must be pressed in a direction to the left (compare the positions of the tip 10 in FIGS. 4 and 5). The diaphragm spring 104 of the friction clutch 101 of FIG. 9 is tiltable between two circular wire-like seats 105 and 105a which are held against axial movement relative to the bottom wall or end wall 102a of the housing or cover 102. The means for holding the seats 105, 105a (and the diaphragm spring portion between them) against axial movement relative to the end wall 102a comprises a plurality of substantially U-shaped lungs 102b which are of one piece with or are welded or otherwise affixed to the radially innermost portion of the end wall 102a and extend in substantial parallelism with the axis of the pressure plate 103 through the slots between the prongs of the diaphragm spring 104. The left-hand leg of the lug 102b which is shown in FIG. 9 partially overlies the seat 105a so that the latter cannot move away from the end wall 102a and thus holds the seat 105 as well as the adjacent portion of the diaphragm spring 104 against axial displacement toward the pressure plate 103.

The compensating unit 117 of the friction clutch 101 also comprises a resilient wear detector 137 in the form of a membrane having an elastically deformable section or portion 138 riveted to the housing 102 and overlying the outer side of the end wall 102a, i.e., that side which faces away from the diaphragm spring 104. The fasteners in the form of rivets (one shown in FIG. 9) can be replaced by any other suitable means for reliably affixing the section 138 of the membrane 137 to the housing 102. The membrane 137 further comprises substantially axially parallel portions 141 which extend through the slots between the neighboring prongs of the diaphragm spring 104 and have radially outwardly extending end portions or abutments 141a for the right-hand side of the ring 120 forming part of the wear compensating unit 117. The clearance or distance L between the abutments 141a of the axially extending portions 141 of the membrane 137 and the U-shaped lugs 102b of the end wall 102a is necessary in order to permit disengagement of the friction clutch 101, i.e., to permit axial movements of the pressure plate 103 in a direction away from the counterpressure plate (not shown) and toward the end wall 102a.

The washer-like radially outer portion of the diaphragm spring 104 abuts a circular wire-like seat 118a carried by the ring 118 of the wear compensating unit 117. In this embodiment of the improved friction clutch, the ring 118 is concentric with and is disposed radially outwardly of the ring 120 (compare the positions of the rings 18, 20 in FIG. 1). The ring 120 has a set of arcuate circumferentially extending ramps 123 which cooperate with complementary ramps 122 at the adjacent side of the pressure plate 103. Analogously, the ring 118 has a set of arcuate circumferentially extending ramps 119 which cooperate with complementary ramps 121 at the adjacent side of the pressure plate 103. The manner in which the ramps 119, 123 of the rings 118, 120 cooperate with the complementary ramps 121, 122 of the pressure plate 103 is analogous to that already described with reference to the ramps 19, 21 and 22, 23 on the rings 18, 20 and end wall 2a in the friction clutch 1 of the FIGS. 1 to 8a. The inclination and the finish of the abutting ramps 119, 121 and 122, 123 are preferably such that the rings 118, 120 and the pressure plate 103 normally establish a self-locking action to prevent accidental axial shifting of the pressure plate toward the counterpressure plate. In contrast to the construction of the wear compensating unit 17 in the friction clutch 1 of the FIGS. 1 to 8a, the pressure plate 103 of the friction clutch 101 in FIG. 9 is movable axially relative to the end wall 102a of the housing 102 as well as relative to the diaphragm spring 104 for the purpose of compensating for wear upon the friction linings of the clutch disc (not shown in FIG. 9).

Instead of being formed directly on the pressure plate 103, the complementary ramps 121, 122 can be formed on a separately produced part (e.g., a washer-like part 803a shown in FIGS. 21 and 22) which is affixed to the pressure plate to confront the diaphragm spring 104. Such separately produced part which is to serve as a carrier of complementary ramps 121, 122 can be welded or otherwise bonded to the pressure plate, i.e., the illustrated plate 103 can be replaced with one including a left-hand portion which is provided with a friction surface to apply a requisite force against the adjacent set of friction linings when the friction clutch 101 is engaged, and a right-hand portion which serves as a carrier of the complementary ramps 121, 122. Still further, it is possible to non-rotatably, but axially movably, secure the ring 118 and/or 120 to the pressure plate 103 and to provide the complementary ramps 121 and/or 122 on a separately produced part which is installed between the pressure plate 103 and the washer-like portion of the diaphragm spring 104 and is turnable relative to the pressure plate. All of the just enumerated modifications will be readily comprehended without additional illustrations upon perusal of the description of FIGS. 9 and 21–22.

The ring 120 cooperates with the wear detector 137, and more particularly with the aforementioned deformable (axially yieldable) section 138 and its prongs 141 with abutments 141a. The illustrated wear detector 137 is made of one piece; however, it is equally possible to assemble such wear detector of two or more parts, for example, of an annulus of components each of which has at least one prong 141 extending through a slot between two neighboring prongs of the diaphragm spring 104 and provided with one or more abutments (141a) for the ring 120. Irrespective of its construction, the wear detector 137 must be designed and mounted to offer a predetermined minimal resistance to deformation which suffices to ensure that the ring 120 cannot be moved axially in the absence of any wear (or in the absence of any non-compensated additional wear) upon the friction linings of the clutch disc forming part of the friction clutch 101. The ring 118 is also held against rotation (e.g., in a manner as described in connection with the ring 18 of the wear compensating unit 17 in the friction clutch 1 of FIGS. 1 to 8a) when the friction linings are still intact or subsequent to one or more adjustments but in the absence of any additional wear upon the friction linings.

The diaphragm spring 104 is stressed relative to the housing 102 in such a way that it continues to bear axially against the pressure plate 103, also when the friction clutch 101 is disengaged. In other words, the seat 118a at the right-hand side of the ring 118 is in continuous contact with and is biased by the washer-like radially outer portion of the diaphragm spring 104. The means for biasing the diaphragm spring 104 against the seat 118a can include springs, e.g., leaf springs corresponding to the leaf springs 15 in the friction clutch 1 of FIGS. 1 to 8a. The bias of such leaf springs should suffice to ensure that the diaphragm spring 104 will bear against the seat 118a (i.e., against the ring 118). If the pressure plate 103 is biased toward the diaphragm spring 104 by leaf springs (such as the springs 15 in the friction clutch 1 of FIG. 1) and/or by analogous resilient elements, the bias of the leaf springs must be such that the force between the pressure plate 103 and the diaphragm spring 104 (this force opposes the bias of the diaphragm spring 104 upon the seat 118a) must be taken into consideration. Furthermore, the means for biasing the pressure plate 103 and the housing 102 axially relative to each other must be designed to take into consideration the forces which develop due to inertia of axially moving parts, especially the inertia of the pressure plate 103 as well as accelerations which develop as a result of oscillation of such axially movable parts.

When the diaphragm spring 104 is tilted (in a clockwise direction, as viewed in FIG. 9) between the seats 105, 105a in order to effect a disengagement of the friction clutch 101, the extent of axial movement (distance L) of the pressure plate 103 away from the counterpressure plate is determined by the prongs 141 of the wear detector 137. The axial movement of the pressure plate 103 away from the counterpressure plate is terminated when the section 138 of the wear detector 137 is deformed by the pressure plate (which is shifted axially toward the housing 102 by the aforediscussed leaf springs and/or by other suitable biasing means) so that the abutments 141a engage the adjacent prongs 102b of the housing 102.

The mode of operation of the wear compensating unit 117 in the friction clutch 101 of FIG. 9 is analogous to that of the aforediscussed wear compensating unit 17. FIG. 9 illustrates the pressure plate 103 in an axial position corresponding to that when the wear upon the friction linings of the clutch disc is nil. When the extent of wear upon the friction linings suffices to warrant an adjustment of the axial position of the pressure plate 103, i.e., when the pressure plate 103 is located to the left of the position which is shown in FIG. 9 while the friction clutch 101 is engaged, the ring 120 is free to change its angular position in order to compensate for wear upon the friction linings. This entails the development of a space (see the space 45 in FIG. 7a) between the cooperating arms (not specifically shown) of the rings 118, 120. When the friction clutch 101 is thereupon disengaged, the ring 120 and the pressure plate 103 move axially toward the end wall 102a of the housing 102. Joint axial displacement of the ring 120 and pressure plate 103 toward the end wall 102a results in stressing (elastic deformation) of the section 138 of the wear detector 137. When the distance L is reduced to zero, the axial movements of the pressure plate 103 and ring 120 are terminated. The extent of axial movement of the pressure plate 103 to disengage the friction clutch 101 is selected in such a way that, at least when the friction linings have undergone a certain amount of wear, the conicity of the diaphragm spring 104 continues to change to a certain extent after the distance L is already reduced to zero. This results in a reduction of axial stress upon the ring 118 and enables one or more springs (corresponding to the coil spring 28 in the wear compensating unit 17) to turn the ring 118 in the same direction as the ring 120 (which was already turned by the spring 129 so as to establish a space corresponding to that shown at 45 in FIG. 7a). The turning of the ring 118 is completed when the width of the just mentioned space between the cooperating arms of the rings 118, 120 is reduced to zero (see the mutual positions of the arms 34, 35 in FIG. 8a). The ring 118 need no longer be biased by the diaphragm spring 104 because this ring cannot turn in a direction to move the pressure plate 103 toward the counterpressure plate since the ring 120 is held against rotation and prevents any further turning of the ring 118 in a direction to compensate for wear upon the friction linings of the clutch disc in the friction clutch 101 of FIG. 9.

Figure 10:
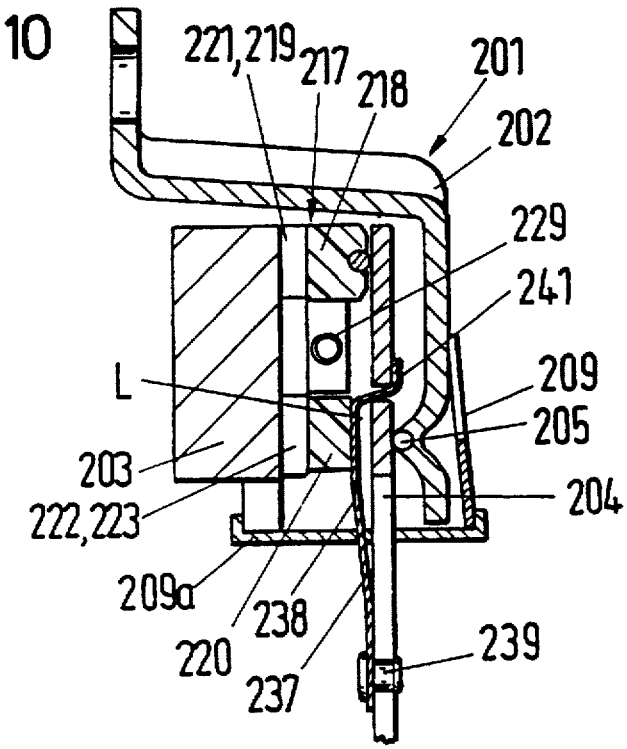
FIG. 10 is a similar fragmentary axial sectional view of a push-type friction clutch embodying a third wear compensating unit.

Referring to FIG. 10, there is shown a portion of a third push-type friction clutch 201 wherein the diaphragm spring 204 is biased (pulled) against the seat 205 at the inner side of the end wall of the housing or cover 202. The biasing means comprises an energy storing element or sensor 209 in the form of a diaphragm spring at the outer side of the end wall of the housing 202. The sensor 209 operates between the end wall of the housing 202 and the pressure plate 203 in a direction to pull the pressure plate toward the diaphragm spring 204. The means for connecting the sensor 209 with the pressure plate 203 comprises a set of U-shape clamps 209a each having a first leg engaging the radially inner portion of the sensor 209, a second leg engaging a radially inwardly extending protuberance of the pressure plate 203 and an axially parallel web extending through a slot between the radially inwardly extending prongs of the diaphragm spring 204.

The illustrated sensor 209 can be replaced by a sensor which is installed directly between the housing 202 and the pressure plate 203 to urge the pressure plate toward the bottom wall or end wall of the housing 202.

The bias of the sensor 209 in the axial direction of the pressure plate 203 is selected in such a way that it exceeds the maximum force which is necessary to disengage the friction clutch 201, i.e., the maximum force which is necessary to tilt the diaphragm spring 204 about the fulcrum defined by the seat 205. It has been found that the friction clutch 201 operates quite satisfactorily if the bias of the sensor 209 upon the pressure plate 203 at least equals or approximates 1.1 times the maximum disengaging force during the entire useful life of the friction clutch 201. However, it is also possible to employ a sensor whose bias greatly or at least considerably exceeds 1.1 times the maximum disengaging force. It is advisable to select the characteristics and the mounting of the sensor 209 in such a way that, during the entire useful life of the friction clutch 201, the bias of the sensor upon the pressure plate 203 exhibits a substantially constant distance-to-force progress. This ensures that the bias of the diaphragm spring 204 upon the pressure plate 203 remains at least substantially constant. However, it is equally within the purview of the invention to select a sensor 209 whose force-to-distance characteristic varies in accordance with a predetermined pattern during successive stages of adjustment by the wear compensating unit 217, for example, to compensate for increasing bias of the resilient means (such as the leaf springs 15 in the friction clutch 1 of FIGS. 1 to 8a) in response to progressing wear upon the friction linings. These springs prevent rotation of the housing 202 and pressure plate 203 relative to each other while permitting the pressure plate to move axially of the housing toward and away from the counterpressure plate.

The wear compensating unit 217 of the friction clutch 201 shown in FIG. 10 is installed between the diaphragm spring 204 and the pressure plate 203 and also comprises two concentric rings 218, 220 with ring 218 located radially outwardly of and spacedly surrounding the ring 220, i.e., the same as shown in FIG. 9. The rings 218, 220 respectively comprise circumferentially extending arcuate sloping ramps 219, 223 which cooperate with complementary ramps 221, 222 at the adjacent side of the pressure plate 203. The wear detector 237 in the compensating unit 217 is or includes a membrane or a diaphragm spring (hereinafter called membrane) having a radially inner portion which is secured to the diaphragm spring 204 by rivets 239 and/or in any other suitable way. The washer-like circumferentially complete radially outer portion 238 of the membrane 237 is spaced apart from the left-hand side of the washer-like portion of the diaphragm spring 204 by a distance L which determines the extent of movement of the pressure plate 203 during disengagement of the friction clutch 201. The resilient membrane 237 is installed in stressed condition and, to this end, the section 238 includes axially parallel portions or lugs 241 extending through windows in the washer-like portion of the diaphragm spring 204 to bear against that side of the washer-like portion which confronts the end wall of the housing 202. The purpose of the membrane 237 is to prevent unintentional (i.e., undesirable) angular movements of the ring 220. The rings 218, 220 are constructed and mounted to cooperate in a manner as described for the rings 18, 20 with reference to FIGS. 4 to 8a, i.e., such rings comprise arms (corresponding to the arms 34, 35) and are biased by springs (corresponding to the springs 28, 29 and one shown at 229).

FIG. 10 shows the friction clutch 201 in engaged condition. In order to disengage this clutch, the diaphragm spring 204 is tilted in a clockwise direction, as viewed in FIG. 10, to reduce the bias upon the pressure plate 203. The ring 220 moves axially toward the end wall of the housing 202, i.e., toward the washer-like radially outer portion of the diaphragm spring 204. This causes the wear detector or membrane 237 to store additional energy until its section 238 reaches and comes into abutment with the diaphragm spring 204 which, for all practical purposes, terminates the axial movement of the pressure plate 203 away from the counterpressure plate (not shown). Thus, if the diaphragm spring 204 continues to pivot in a clockwise direction, the bias upon the ring 218 is relaxed but the latter does not change its angular position relative to the pressure plate 203 if the wear upon the friction linings (not shown) is nil or subsequent to compensation for such wear and prior to development of additional wear. The reason is that the arms (corresponding to the arms 34, 35 shown in FIGS. 4a to 8a) abut each other so that the ring 218 is held by the ring 220. The latter cannot turn because it is biased by the membrane 237 against the pressure plate 203.

If the friction linings have undergone a certain amount of wear which should be compensated for by the unit 217, the pressure plate 203 moves to the left by a distance such that the bias upon the ring 220 is reduced. This ring is therefore free to turn to an extent which is necessary to compensate for detected wear upon the friction linings (as indicated by the extent of movement of the pressure plate 203 beyond the axial position of FIG. 10 in a direction away from the end wall of the housing 202). The extent of axial adjustment of the ring 220 is limited by the membrane 237. When the friction clutch 201 is disengaged subsequent to such angular displacement of the ring 220, this results in a reduction of bias upon the ring 218 (in a manner as described above with reference to the wear compensating unit 117 in the friction clutch 101 of FIG. 9) so that the angular position of the ring 218 is changed by the spring or springs (such as 229) of the turning means until the trailing arm (see the arm 34 in FIGS.

4a to 8a) abuts the leading arm (see the arm 35 in FIGS. 4a to 8a) of the associated ring 220. This ensures that the axial adjustment of the pressure plate 203 is sufficient to compensate for detected wear upon the friction linings.

The exact mode of operation of the wear compensating units 117 and 217 is analogous to that of the wear compensating unit 17 (as described with reference to FIGS. 4 to 8a).

In the embodiments of FIGS. 9 and 10, wherein at least the major part of the wear compensating unit is installed between the diaphragm spring and the pressure plate, the braking action of the wear detector 137 or 237 increases in response to disengagement of the friction clutch, i.e., in response to axial movement of the pressure plate 103 or 203 toward the bottom wall or end wall of the housing 102 or 202.

The ring 120 or 220 cannot turn relative to the housing, diaphragm spring and/or pressure plate in the disengaged condition of the respective friction clutch 101 or 201 because such ring is then biased against the pressure plate 103 or 203 by the wear detector 137 or 237 which stores more energy than in the engaged condition of the respective clutch. In fact, the ring 220 of FIG. 10 is forced (by the pressure plate 203) not only against the adjacent portion or portions of the wear detector 237, but also (indirectly) against the washer-like portion of the diaphragm spring 204.

FIGS. 11 to 13 illustrate a portion of a so-called pull-type friction clutch 301 wherein the radially innermost portions or tips 310 of radially inwardly extending prongs forming part of the diaphragm spring 304 must be pulled in a direction to the right (as viewed in FIG. 11) in order to disengage the clutch, i.e., to move the pressure plate 303 axially and away from the counterpressure plate (not shown). The radially outer or outermost part of the washer-like radially outer portion of the diaphragm spring 304 is tiltable relative to a circular wire-like seat 305 which is partially recessed into the adjacent side of a ring 318 forming part of the wear compensating unit 317 in the friction clutch 301. The ring 318 is installed between the diaphragm spring 304 and the radially extending end wall or bottom wall 302a of the housing or cover 302. A radially inner part of the washer-like portion of the diaphragm spring 304 engages the projections 313 of the pressure plate 303, and this diaphragm spring is coupled with a wear detector 337 having a median or main section 338 disposed at that side of the diaphragm spring 304 which confronts the end wall 302. The connection between the diaphragm spring 304 and the wear detector 337 can include a bayonet mount. The illustrated wear detector 337 is a diaphragm spring and the radially outer part of its section 338 is provided with axially parallel hook-shaped portions 341 extending through openings or windows 304a of the diaphragm spring 304. The surfaces surrounding the windows 304a cooperate with the hook-shaped portions 341 to ensure that the parts 304, 337 cannot be separated from each other in the direction of their common axis but the connection 304a, 341 permits some angular movements of the parts 304, 337 relative to one another so as to permit engagement or disengagement of the bayonet mount. In order to prevent any uncontrolled movements of the parts 304, 337 relative to one another, the washer-like portion of the diaphragm spring 304 is further provided with openings or windows 304b which are located radially inwardly of the windows 304a and receive lug-shaped portions 341a of the wear detector 337. The lug-shaped portions 341a extend in parallel with the axis of the pressure plate 303. The arrangement is such that, when the hook-shaped portions 341 have been caused to enter the adjacent windows 304a and the parts 304, 337 are turned relative to each other to activate the bayonet mount, the lug-shaped portions 341a penetrate into the adjacent windows 304b to thus prevent accidental separation of the parts 304 and 337 from one another. The wear detector 337 is mounted with its section 338 in an axially stressed condition. The purpose of the wear detector 337 is to prevent any changes in the angular position of the ring 320 in the absence of wear upon the friction linings 307 on the resilient segments 316 of the clutch disc in the friction clutch 301. The ring 320 is concentric with, is disposed radially inwardly of and is spaced apart from the ring 318.

The rings 318, 320 are respectively provided with circumferentially extending arcuate ramps 319, 323 which cooperate with adjacent complementary ramps 321, 322 of the end wall 302a in a manner analogous to that described with reference to the friction clutch 1 of FIGS. 1 to 8a. FIG. 12 shows that the rings 318, 320 are further provided with arms 334, 335 and are biased by coil springs 328, 329 corresponding to the parts 34, 35, 28, 29 in the wear compensating unit 17 of the friction clutch 1. The coil spring 329 extends into sockets which are provided in the confronting surfaces of the arms 334, 335, the same as shown in FIGS. 4a to 8a. The ring 318 is biased by the coil spring 328 in a direction to turn clockwise, as viewed in FIG. 12, in order to eliminate the space or gap 345 (if any) between the arms 334 and 335. The coil spring 328 surrounds a retainer 330 of the end wall 302a of the housing 302 and bears against a radially inwardly extending portion 331 of the ring 318. The portion 331 includes a U-shaped or forked portion or part 332 which has prongs engaged by the adjacent end convolution of the coil spring 328. It will be seen that the spring 328, the ring 318, the spring 329 and the ring 320 operate in series, the same as in the wear compensating unit 17 of the friction clutch 1.

The wear detector 337 is effective to prevent any changes in the angular position of the ring 320 until and unless the friction linings 307 have undergone at least some wear which warrants compensation by changing the angular position of the ring 318. The latter is held against undesired rotation by the ring 320 and is permitted to turn only when the wear upon the friction linings 307 warrants an adjustment.

The friction linings 307 which are shown in FIG. 11 are assumed to be new, i.e., the wear upon such friction linings is nil. The housing 302 is mounted on the counterpressure plate (not shown), and the friction linings 307 and the resilient segments 316 of the clutch disc are clamped between the friction surfaces of the pressure plate 303 and the counterpressure plate so that the clutch disc is compelled to rotate (e.g., to drive the input shaft of a variable-speed transmission) in response to starting of the engine which drives the counterpressure plate. If the friction clutch 301 is to be disengaged, the tips 310 of prongs forming part of the diaphragm spring 304 are caused to move in a direction to the right (as viewed in FIG. 11) so that the diaphragm spring is tilted on the seat 305 and cooperates with the ring 320 to further stress the wear detector 337 axially until the distance or clearance L (shown in FIG. 11) is reduced to zero. Such distance determines the extent of moveability of the pressure plate 3 in a direction toward the end wall 302a in order to disengage the friction clutch 301. The section 338 of the wear detector 337 then lies flat against the adjacent side of the diaphragm spring 304 as well as against the adjacent side or surface 302a of the ring 320.

If the pivoting or tilting of the diaphragm spring 304 (in a direction to move the tips 310 to the right, as viewed in FIG. 11) continues, the diaphragm spring begins to move away from the seat 305 because it is then tilted relative to the surface 320a of the ring 320. Thus, the bias of the diaphragm spring 304 upon the seat 305 is relaxed so that, in the presence of wear (or additional wear) upon the friction linings 307, the ring 318 can be turned to compensate for such wear. It will be seen that, in a pull-type clutch 301 of the character shown in FIGS. 11 to 13, the diaphragm spring 304 first acts not unlike a one-armed lever (by pivoting along the seat 305) and thereupon as a two-armed lever because it pivots along the surface 320a of the ring 320. The transition from operation as a one-armed lever to operation as a two-armed lever takes place when the distance L is reduced to zero and the diaphragm spring 304 continues to turn in a counterclockwise direction, as viewed in FIG. 11.

The transmission ratio or lever arm of the diaphragm spring 304 changes as a result of the transfer of pivot point or fulcrum from the seat 305 radially inwardly toward the surface 320a of the ring 320. Such transmission ratio determines the magnitude of the force which is required to pivot the diaphragm spring 304 during disengagement of the friction clutch 301. If the initial transmission ratio was $i$, it is reduced to $i-1$, i.e., an increase of the clutch disengaging force can take place when the washer-like portion of the diaphragm spring 304 moves away from contact with the seat 305 to move into contact with the surface 320a of the ring 320. As used herein, the term "transmission ratio" or "lever arm" $i$ is intended to denote the ratio of the distance between the locus of application of the disengaging force to the tips 310 of the prongs forming part of the diaphragm spring 304 and the locus of contact between the diaphragm spring and the seat 305 to the distance between the locus of contact with the seat 305 and the loci of contact between the diaphragm spring and the projections 313 of the pressure plate 303. The aforementioned change of the transmission ratio from $i$ to $i-1$ is based on the assumption that the loci of contact between the diaphragm spring 304 and the projections 313 of the pressure plate 303 are disposed at the same (or nearly the same) radial distance from the axis of the pressure plate as the locus or loci of contact between the diaphragm spring and the surface 320a of the ring 320. If the locus or loci of contact between the diaphragm spring 304 and the surface 320a of the ring 320 are shifted radially outwardly toward the seat 305, the extent to which the magnitude of the disengaging force must be increased when the diaphragm spring 304 begins to pivot relative to the surface 320a of the ring 320 is reduced accordingly.

If the wear upon the friction linings 307 is sufficient to warrant compensation by the ring 318, engagement of the friction clutch 301 results in a change of conicity of the diaphragm spring 304, namely the tips 310 of prongs forming part of the diaphragm spring 304 move further to the left, as viewed in FIG. 11. This results in a relaxation of the bias upon the ring 320 so that the latter can be turned by the spring 329 through an angle which is commensurate with the extent of wear. Thus, a change in the angular position of the ring 320 precedes that of the ring 318. Such turning of the ring 320 relative to the ring 318 results in the development of the space 345 (also shown in FIG. 12) between the arms 334 and 335 of the respective rings 318, 320, and the width of this space is proportional to the required extent of angular movement of the ring 318 in order to compensate for wear upon the friction linings 307. When the just discussed engagement of the friction clutch 301 is followed by the next disengagement, the bias of the diaphragm spring 304 upon the ring 318 is reduced (in a manner as already described hereinbefore in connection with the embodiments of FIGS. 1–8a, 9 and 10) and the spring 328 is free to turn the ring 318 (in the direction of the arrow PP in FIG. 12) so that the width of the space 345 is reduced to zero and the unit 317 has compensated for wear upon the friction linings 307. The conicity of the diaphragm spring 304 is thereby restored to that when the wear upon the friction linings 307 is nil. As the wear upon the friction linings 307 progresses and the ring 318 is caused to repeatedly turn in a direction to compensate for such wear, the diaphragm spring 304 is gradually shifted axially and away from the end wall 302a of the housing 302, always to the extent as determined by the ring 320 which is turned by the coil spring 329 prior to turning of the ring 318 by the coil spring 328. Each angular adjustment of the ring 318 entails a corresponding change of conicity of the diaphragm spring 304.

Figure 14:
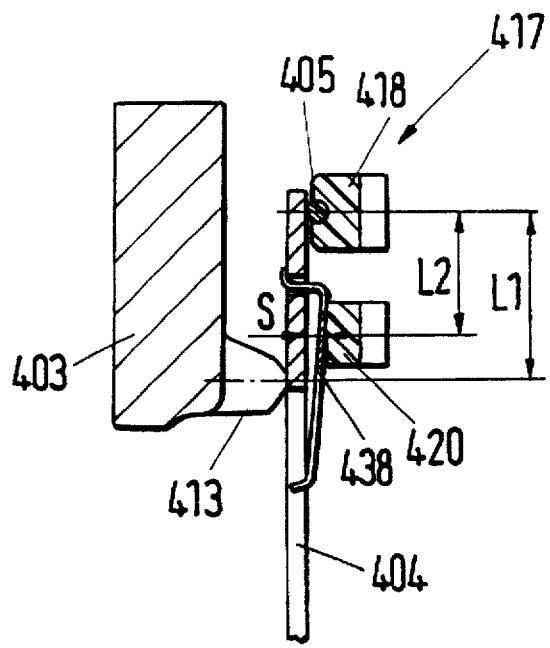
FIG. 14 is a fragmentary axial sectional view of a friction clutch and of a wear compensating unit constituting a modification of the unit shown in FIGS. 11 to 13.

The friction clutch with the structure of FIG. 14 has a wear compensating unit 417 which is similar to the unit 317 of FIGS. 11 to 13. The main difference is that the ring 420 of the wear compensating unit 417 is disposed between the seat 405 for the washer-like radially outer portion of the diaphragm spring 404 and the locations of abutment between the projections 413 of the pressure plate 403 and the diaphragm spring. Thus, the diameter of the ring 420 is relatively large (even though smaller than that of the concentric ring 418) which ensures that, during disengagement of the friction clutch with the structure of FIG. 14, the locus of tilting of the diaphragm spring 404 relative to the ring 420 is closer to the ring 418. Consequently, the increase of disengaging force during tilting of the diaphragm spring 404 relative to the ring 420 (rather than relative to the seat 405) is less pronounced than in the friction clutch 301 of FIGS. 11 to 13. The section 438 of the wear detector is connected to the diaphragm spring 404 by a bayonet mount in a manner analogous to that described in connection with the attachment of wear detector 337 and diaphragm spring 304 to each other.

In the friction clutch which embodies the structure of FIG. 14, L1 is the radial distance between the seat 405 and the annulus of projections 413 on the pressure plate 403, and L2 is the radial distance between the seat 405 and the center of the radially outermass part of the ring 420. With this structure the distance S covered by the section 338 of the wear detector at the radial level of circular contact between the diaphragm spring 404 and the ring 420 must be selected in such a way that it at least approximates the extent of possible axial shifting of the pressure plate 403 during disengagement of the friction clutch multiplied by L2/L1. Thus, the distance S which can be covered by the section 438 at the radial level of contact between the ring 420 and the diaphragm spring 404 must be related to the maximum distance V which can be covered by the pressure plate 403 during disengagement of the friction clutch in such a way that it at least substantially satisfies the equation $V = S \times L1/L2$.

Figure 15:
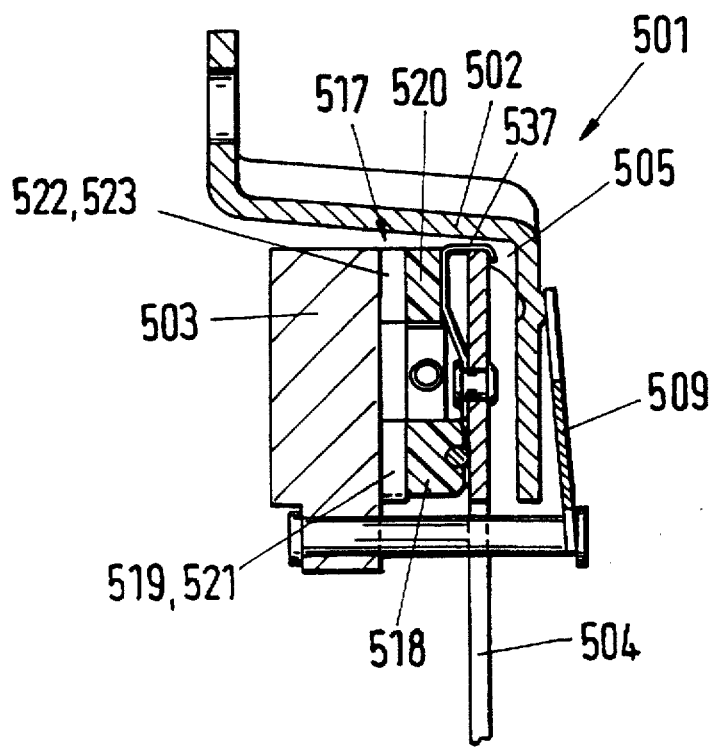
FIG. 15 is a fragmentary axial sectional view of a friction clutch and of a wear compensating unit constituting a modification of the unit which is shown in FIG. 10.

FIG. 15 illustrates a portion of a pull-type friction clutch 501 which comprises a wear compensating unit 517 installed between the diaphragm spring 504 and the pressure plate 503 (as seen in the axial direction of the pressure plate). The radially outermost part of the washer-like radially outer portion of the diaphragm spring 504 abuts a seat 505 which is provided therefor at the inner side of the end wall of the housing or cover 502, and a radially inner part of such washer-like portion of the diaphragm spring 504 engages a circular wire-like seat at the right-hand side of the ring 518. The arcuate ramps 519 of the ring 518 cooperate with complementary ramps 521 at the adjacent side of the pressure plate 503. The ring 520 is located radially outwardly of, concentric with and spaced apart from the ring 518. The ramps 523 of the ring 520 engage the adjacent complementary ramps 522 of the pressure plate 503.

A resilient wear detector 537 which can include or constitute a membrane or a diaphragm spring has a radially inner portion riveted to the diaphragm spring 504 and a radially outer portion which abuts the ring 520; the dimensions and the manner of mounting the wear detector 537 are such that the force which is required to stress the part 537 exceeds the axial adjusting force acting upon the ring 520. In order to ensure that, in the event of axial vibrations, the pressure plate 503 and/or the ring 518 cannot be lifted off the diaphragm spring 504, the pressure plate 503 is further biased by a resilient element or sensor here shown as a diaphragm spring 509 which reacts against the outer side of the end wall of the housing 502 and pulls the pressure plate 503 toward the rings 518, 520 in a manner similar to that already described in connection with the pressure plate 203, rings 218, 220 and housing 202 in the friction clutch 201 of FIG. 10. The sensor 509 ensures that the ring 520 cannot move away from contact with the wear detector 537.

When the friction linings to the left of the pressure plate 503 shown in FIG. 15 have undergone a certain amount of wear which warrants compensation by the unit 517, the orientation (conicity) of the diaphragm spring 504 is changed accordingly, namely in such a way that the radially inner portions of the diaphragm spring move in a direction to the left (as viewed in FIG. 15) to an extent corresponding to axial shifting of the pressure plate 503 beyond its starting or zero position (i.e., toward the counterpressure plate, not shown in FIG. 15). This results in relaxation of pressure upon the ring 520 so that the latter can change its angular position to an extent which is necessary to compensate for wear upon the friction linings, namely to an extent which is determined by the wear detector 537. During the next-following disengagement of the friction clutch 501, the diaphragm spring 504 relaxes the pressure upon the ring 518 as soon as the pressure plate 503 has completed the predetermined movement axially of and away from the counterpressure plate; this enables the ring 518 to turn and to move the pressure plate toward the counterpressure plate through a distance which is commensurate with the detected extent of wear upon the friction linings.

The extent of axial movement of the pressure plate 503 away from the counterpressure plate (i.e., toward the end wall of the housing 502) during disengagement of the friction clutch 501 can be determined by the diaphragm spring 504 if the radially outermost part of the diaphragm spring is located in the path of movement of the pressure plate. However, it is equally possible to limit the extent of movement of the pressure plate away from the counterpressure plate in a different way, e.g., by providing one or more stops for a portion of the pressure plate. By way of example only, an abutment or stop for the pressure plate 503 can be mounted or formed directly on the pressure plate 503 so as to abut the housing 502 and/or vice versa.

The force which is required to stress the wear detector 537 is much smaller than the axial force which is applied to the pressure plate 503 by the sensor 509. Thus, the wear detector 537 is caused to store energy by the sensor 509 during disengagement of the friction clutch 501.

It is of advantage, at least in many or in most instances, if the radial distance between the abutment and/or rolling-contact portions of the rings forming part of the wear compensating unit at least approximates the radial distance of the abutment for the diaphragm spring with the housing or cover from the location(s) of contact between the diaphragm spring and the pressure plate. This can ensure that, during an adjustment to compensate for wear upon the friction linings, the axial distance which is covered by the ring 20, 120, 220, 320, 420 or 520 at least approximates the extent of wear in the axial direction of the friction clutch.

Figure 16:
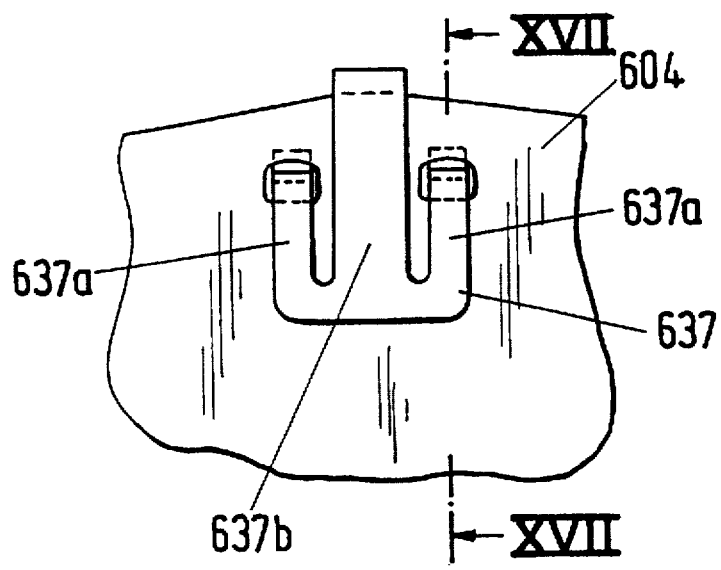
Figure 17:
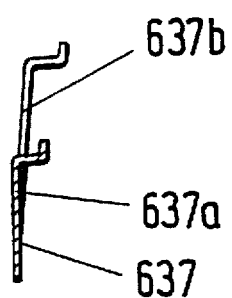
FIG. 17 is a fragmentary sectional view substantially as seen in the direction of arrows from the line XVII—XVII in FIG. 16.

FIGS. 16 and 17 illustrate the details of a modified resilient wear detector 637 which is constituted by a clamp mounted on the diaphragm spring 604. Such a wear detector is normally used with one or more additional wear detectors 637 in preferably uniform distribution along the periphery of the diaphragm spring 604. The illustrated wear detector 637 is secured to the adjacent portion of the diaphragm spring 604 by snap action. To this end, the wear detector comprises a centrally located leg or prong 637b which engages one side of the marginal portion of the diaphragm spring 604, and two additional legs or prongs 637a which engage the other side of the diaphragm spring and flank the prong 637b. The prong 637b is substantially U-shaped and its web overlies the periphery of the adjacent portion of the diaphragm spring 604 radially outwardly of the tips of the shorter prongs 637a. Two or more wear detectors 637 of the type shown in FIGS. 16 and 17 can be utilized, for example, in lieu of the wear detector 37 in the friction clutch 1 of FIGS. 1 to 8a.

Figure 20:
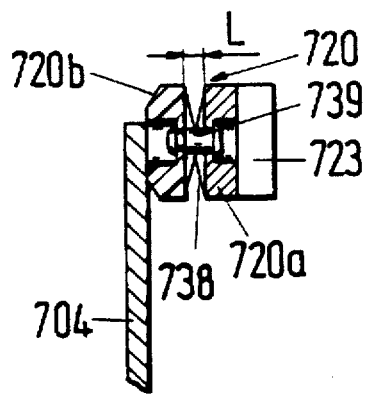
FIG. 20 is a fragmentary axial sectional view of a friction clutch and of a portion of still another wear compensating unit utilizing a composite ring with two coaxial resilient annular members.

FIG. 20 illustrates a composite ring 720 which is assembled of a plurality of discrete sections or portions. As shown, the ring 720 can be assembled of two sections 720a and 720b with at least one resilient member 738 between them. The composite ring 720 can be utilized, for example, in lieu of the ring 20 in the wear compensating unit 17 of the friction clutch 1 shown in FIGS. 1 to 8a. This would necessitate certain modifications of the unit 17.

The sections 720a, 720b of the composite ring 720 are held against axial movement away from each other beyond the distance shown in FIG. 20 (and under the bias of the resilient member or members 738) by a set of rivets 739 (only one shown in FIG. 20). Each of the sections 720a, 720b is preferably a circumferentially complete annular body or member. The resilient member 738 urges the sections 720a, 720b axially and away from each other so that, in the absence of the application of an opposing force, the distance between the two sections matches the maximum distance permitted by the heads of the rivets 739 (or any other means employed to limit the extent of axial movability of the two sections away from each other).

The ramps 723 are provided at that side or surface of the section 720a which faces away from the section 720b, and these ramps can cooperate with suitably configurated and dimensioned complementary ramps, such as the ramps 22 at the inner side of the end wall 2a of the housing 2 in the friction clutch 1 of FIG. 1. The resilient member or members 738 cooperate with the sections 720a, 720b of the ring 720 to jointly constitute a wear detector corresponding to the part 37 in the wear compensating unit 17. The diaphragm spring 704 biases the section 720b of the ring 720 at least during disengagement of the friction clutch which embodies the structure of FIG. 20 so that the resilient member or members 738 then store energy or additional energy. This prevents undesirable (accidental) angular adjustment of the composite ring 720, i.e., an unnecessary compensation for (non-existent) wear upon the friction linings.

When the section 720b of the composite ring 720 covers a predetermined axial distance (such as that shown at L), the distance between the sections 720a and 720b cannot be further reduced so that the composite ring 720 then constitutes or defines a fulcrum for tilting of the diaphragm spring 704 in a manner as fully described with reference to the wear compensating unit 17 in the friction clutch 1 of FIGS. 1 to 8a. Thus, if the composite ring 720 is used jointly with the ring 18 of the wear compensating unit 17, and the diaphragm spring 704 is tilted relative to the composite ring 720 (i.e., subsequent to tilting along the seat 5), the bias of the diaphragm spring 704 upon the ring 18 is reduced so that the ring 18 can turn in order to compensate for wear (if any) upon the friction linings 7. The extent of angular displacement of the ring 18 is determined by the extent of preceding angular displacement of the composite ring 720.

Figure 21:
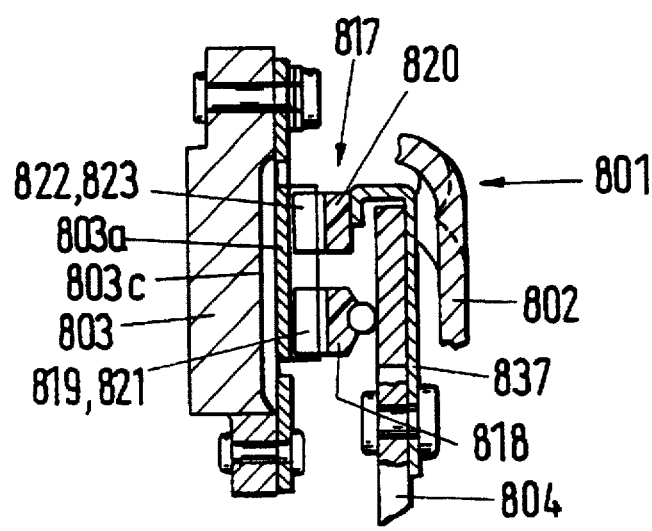
FIG. 21 is a fragmentary axial sectional view of a friction clutch which embodies still another wear compensating unit.
Figure 22:
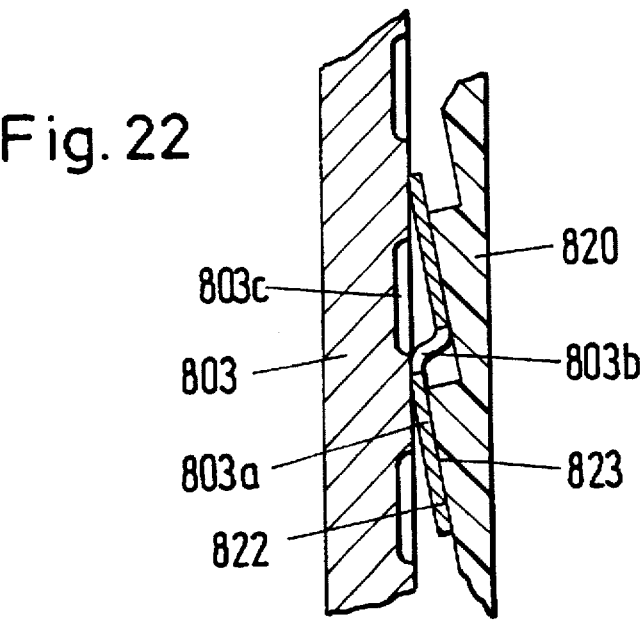
FIG. 22 is an enlarged sectional view of the pressure plate and of one ring in the wear compensating unit of FIG. 21 in a view similar to that of FIG. 3.

Referring now to FIGS. 21 and 22, there is shown a portion of a further friction clutch 801 having a wear compensating unit 817 which is similar to the unit 517 in the friction clutch 501 of FIG. 15. Thus, the compensating unit 817 is installed between the diaphragm spring 804 and the pressure plate 803. However, the resilient wear detector 837 of the compensating unit 817 is affixed to and is located at that side of the diaphragm spring 804 which confronts the end wall of the housing 802. The rings 818 and 820 of the compensating unit 817 are respectively provided with ramps 819 and 823 which cooperate with complementary ramps 821, 822 on a sheet-metal attachment 803a at the adjacent side of the pressure plate 803. The attachment 803a of FIGS. 21 and 22 is riveted to the main portion of the composite pressure plate 803.

As can be seen in FIG. 22, the attachment 803a is provided with passages 803b (e.g., in the form of slots) which alternate with the ramps 821 and/or 822 to permit circulation of a coolant (such as atmospheric air) between the attachment 803a and the main portion of the composite pressure plate 803. The circulation of coolant can be promoted by providing the main portion of the composite pressure plate 803 with one or more at least partially radially extending recesses or channels 803c which communicate with the passages 803b; this ensures even more satisfactory cooling of the composite pressure plate 803 (including its main portion and the attachment 803a) when the friction clutch 801 is in use.

In order to simplify the assembly of the improved friction clutch (e.g., of the friction clutch 1 shown in FIGS. 1 to 8a), it is advisable to provide the ring 18 and/or 20 of the wear compensating unit 17 with portions or sections which are configurated and/or finished and/or dimensioned in such a way that they can be readily engaged by suitable torque transmitting and/or retaining means. Such torque transmitting and/or retaining means (e.g., suitable tools or implements and hereinafter called tools for short) will be applied to maintain the compensating unit 17 in the retracted position, namely in a position which the unit 17 assumes when the wear upon the friction linings 7 is nil. The tool which is necessary to maintain the compensating unit 17 of the friction clutch 1 in such a position is a relatively simple device which should be capable of maintaining the ring 20 in the retracted position (in which its arm 35 abuts the arm 34 of the ring 18) while the friction clutch 1 is being assembled. The ring 18 is automatically held in the proper starting position if the ring 20 is properly engaged and held by the aforementioned tool. The tool is disengaged from the ring 20 when the attachment of the housing 2 to the counterpressure plate 6 is completed; this results in activation of the wear compensating unit 17, i.e., this unit is then ready to respond, when necessary, in order to turn the ring 20 and thereupon the ring 18 for the purpose of compensating for wear upon the friction linings 7. Similar or analogous tools can be used to temporarily engage and hold in the starting position the rings (such as 120, 220, etc.) of other friction clutches which are shown in the drawings.

Another possibility of maintaining the wear compensating unit (such as 17) of the improved friction clutch in the starting position during assembly of the friction clutch is to provide at least one suitable blocking or arresting device (not shown) which operates between the pressure plate (such as 3) and the housing (such as 2) and/or between the diaphragm spring (such as 4) and the housing to hold the pressure plate and/or the diaphragm spring 4 in a retracted or stressed position with reference to the housing. Such position of the diaphragm spring and/or pressure plate corresponds to the positions which such part or parts assume when the housing is properly connected with the counterpressure plate during assembly of a new friction clutch. For example, the aforementioned arresting or blocking device or devices can include means for limiting the extent of movement of the pressure plate and/or diaphragm spring. Clamps and/or washers or the like can be used to limit the movements of these parts relative to the housing during assembly of a new friction clutch. All that is necessary is to ensure that the diaphragm spring stores sufficient energy when the assembly of the friction clutch is completed.

The improved friction clutch is susceptible of numerous additional modifications without departing from the spirit of the invention. For example, the features of the friction clutch 1 can be combined with or replaced by certain features of the other illustrated and described frictions clutches. The same holds true for the friction clutches 101, 201, 301, the friction clutch embodying the structure of FIG. 14, the friction clutch 501, the friction clutches embodying the structures of FIGS. 16–17 and/or FIG. 20, as well as the friction clutch 801. Moreover, the improved friction clutch can be modified by incorporating therein certain features of the aforediscussed prior publications and/or of the commonly owned copending patent applications. Still further, at least certain discrete elements and certain combinations of elements in the disclosed embodiments of the improved friction clutch are believed to warrant independent patent protection.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An engageable and disengageable friction clutch comprising a rotary first component including a housing rotatable about a predetermined axis; a rotary second component including a pressure plate; a rotary third component including means for non-rotatably connecting said pressure plate to said housing with limited freedom of movement in the direction of said axis; a rotary fourth component including a counterpressure plate adjacent said pressure plate; a fifth component including a torque transmitting clutch disc disposed between said plates and having friction linings which are subject to wear in response to repeated engagement and disengagement of the friction clutch; a rotary sixth component including a diaphragm spring disposed between said housing and said pressure plate to normally bias said pressure plate toward said clutch disc so that said friction linings are clamped between said plates; and means for automatically compensating for wear at least upon said friction linings including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, one of (a) said rings and (b) said displacing device being turnable with respect to at least one of said first to fourth and sixth rotary components.

2. The friction clutch of claim 1, wherein said one component is one of said first and second components.

3. The friction clutch of claim 1, wherein said displacing device comprises ramps.

4. The friction clutch of claim 1, wherein said diaphragm spring includes a plurality of portions disposed at different radial distances from said axis, one of said plurality of portions bearing against one of said rings in the engaged condition of the friction clutch to thereby prevent turning of said displacing device.

5. The friction clutch of claim 4, wherein said displacing device includes a first displacing unit for said one ring and a second displacing unit for the other of said rings, said compensating means further comprising a wear detector which arrests said second displacing unit to prevent adjustment of said other ring, but permits said second displacing unit to adjust said other ring in the engaged condition of the friction clutch after said friction linings have undergone at least some wear, said wear detector being operative to prevent adjustment of said other ring during disengagement of the friction clutch.

6. The friction clutch of claim 5, wherein said compensating means further comprises means for blocking adjustment of said one ring prior to adjustment of said other ring and for permitting adjustment of said one ring upon completed adjustment of said other ring as a result of subsequent disengagement of the friction clutch.

7. The friction clutch of claim 1, wherein said rings are turnable about said axis relative to each other, said displacing device including first ramps provided on one of said rings, complementary second ramps on said one component, third ramps provided on the other of said rings and fourth ramps complementary to said third ramps and provided on said one component, said means for turning including energy storing elements which bias said rings to turn about said axis by urging said first and third ramps to move relative to said second and fourth ramps, respectively.

8. The friction clutch of claim 1, wherein said diaphragm spring has a conicity which is changed as a function of wear upon said friction linings, said compensating means further comprising a wear detector which prevents adjustment of said rings during disengagement of the friction clutch and permits adjustment of said rings in response to a change of conicity of said diaphragm spring as a result of wear at least upon said friction linings.

9. The friction clutch of claim 1, wherein said pressure plate is moved by said diaphragm spring in the direction of said axis as a result of wear at least upon said friction linings, said compensating means further comprising a wear detector which prevents adjustment of said rings during disengagement of the friction clutch, but permits such adjustment in response to movement of said pressure plate as a result of wear at least upon said friction linings.

10. The friction clutch of claim 1, wherein said compensating means is disposed between said diaphragm spring and said pressure plate; and further comprising a resilient sensor having means reacting against one of said housing and said pressure plate and bearing against the other of said housing and said pressure plate.

11. The friction clutch of claim 1, wherein said compensating means operates between said pressure plate and said diaphragm spring.

12. The friction clutch of claim 1, wherein the clutch is disengageably by pushing a portion of said diaphragm spring, at least a portion of said compensating means being disposed between said diaphragm spring and said housing; and further comprising a resilient sensor, said diaphragm spring having a first side facing said portion of said compensating means and a second side biased by said sensor.

13. The friction clutch of claim 1, wherein said compensating means is installed between said pressure plate and said diaphragm spring as seen in the direction of said axis.

14. The friction clutch of claim 1, wherein said one component is movable in the direction of said axis.

15. The friction clutch of claim 14, wherein said one component includes said pressure plate.

16. The friction clutch of claim 1, further comprising a seat for said diaphragm spring, said seat being provided on one of said rings.

17. The friction clutch of claim 1, wherein said displacing device comprises ramps on said pressure plate.

18. The friction clutch of claim 1, wherein said compensating means further comprises a wear detector and said wear detector includes means for preventing adjustment of at least one of said rings during disengagement of the friction clutch.

19. The friction clutch of claim 1, wherein said compensating means further comprises a wear detector and said wear detector includes means for preventing adjustment of at least one of said rings with a variable force during disengagement of the friction clutch.

20. The friction clutch of claim 19, wherein said force increases in response to progressing disengagement of the friction clutch.

21. The friction clutch of claim 1, wherein said rings are rotatable about said axis and said displacing device includes means for moving said rings in the direction of said axis in response to rotation of said rings by said turning means, said compensating means further comprising a wear detector which prevents rotation of at least one of said rings in the engaged condition of the friction clutch, said wear detector comprising at least one section which is resilient in the direction of said axis to bias said at least one ring and one of said components, in the engaged condition of the friction clutch and in the absence of wear, as well as after completed compensation for wear at least upon said friction linings, with a force which prevents rotation of said at least one ring under the action of said turning means, said at least one section permitting said at least one ring to be rotated by said turning means in the engaged condition of the friction clutch.

22. The friction clutch of claim 21, wherein said diaphragm spring has a conicity which changes in response to wear at least upon said friction linings and said at least one section of said wear detector is arranged to at least reduce said force in dependency on the change of conicity of said diaphragm spring in response to wear at least upon said friction linings.

23. The friction clutch of claim 21, wherein said pressure plate is moved in the direction of said axis relative to said housing in response to wear at least upon said friction linings and said at least one section of said wear detector is arranged to at least reduce said force in dependency on the extent of axial movement of said pressure plate in response to wear at least upon said friction linings.

24. The friction clutch of claim 21, wherein said turning means includes means for overcoming the inertia of said at least one ring to thus rotate said at least one ring about said axis.

25. The friction clutch of claim 1, wherein said compensating means further comprises a wear detector having means for preventing adjustment of at least one of said rings during disengagement of the friction clutch, said preventing means including at least one resilient section.

26. The friction clutch of claim 25, wherein said at least one resilient section includes a leaf spring.

27. The friction clutch of claim 25, wherein said at least one resilient section includes a diaphragm spring.

28. The friction clutch of claim 25, wherein said at least one, resilient section stores energy.

29. The friction clutch of claim 25, wherein said compensating means further comprises means for fastening said wear detector to said diaphragm spring.

30. The friction clutch of claim 1, wherein said compensating means further comprises a wear detector operative to prevent adjustment of at least one of said rings during disengagement of the friction clutch, said wear detector including a first portion disposed at a first radial distance from said axis and affixed to said diaphragm spring, and a second portion disposed at a different second radial distance from said axis and bearing against one of said rings.

31. The friction clutch of claim 30, wherein said wear detector further comprises a third portion bearing against said diaphragm spring.

32. The friction clutch of claim 1, wherein said compensating means further comprises a wear detector operative to prevent adjustment of at least one of said rings during disengagement of the friction clutch, said wear detector including a resilient first portion affixed to said housing and a second portion abutting one of said rings and spaced apart from said housing in the engaged condition of the friction clutch, said second portion being moved toward said housing by said pressure plate in response to disengagement of the friction clutch.

33. The friction clutch of claim 1, wherein said compensating means further comprises a wear detector operative to prevent adjustment of at least one of said rings during disengagement of the friction clutch.

34. The friction clutch of claim 33, wherein said wear detector is provided on said at least one ring.

35. The friction clutch of claim 33, wherein said at least one ring comprises a plurality of substantially coaxial annular sections which are biased axially and away from each other.

36. The friction clutch of claim 1, wherein one of said rings comprises a plurality of coaxial annular sections and said compensating means further comprises means for biasing said sections axially relative to each other.

37. The friction clutch of claim 1, wherein one of said rings is an undulate resilient washer.

38. The friction clutch of claim 1 wherein said means for turning comprises at least one spring.

39. The friction clutch of claim 38, wherein said at least one spring reacts against said one component.

40. The friction clutch of claim 38, wherein said means for turning comprises at least one spring for each of said rings and said springs operate in series.

41. The friction clutch of claim 40, wherein at least one spring for one of said rings reacts against said one component, the at least one spring for the other of said rings reacting against said one ring.

42. The friction clutch of claim 41, wherein the at least one spring for said one ring stores a first amount of energy and the at least one spring for said other ring stores a lesser second amount of energy.

43. The friction clutch of claim 1, wherein said rings are rotatable relative to each other about said axis and said means for turning comprises means for rotating said rings in a predetermined direction by way of said displacing device with attendant displacement in the direction of said axis toward said diaphragm spring, said means for turning comprising means for effecting rotation of one of said rings ahead of the other of said rings and means for blocking rotation of said other ring prior to rotation of said one ring.

44. The friction clutch of claim 43, wherein said blocking means includes a first abutment on said one ring and a second abutment on said other ring behind said first abutment as seen in said predetermined direction, said second abutment engaging said first abutment prior to rotation of said one ring ahead of said other ring.

45. The friction clutch of claim 1, wherein said rings are rotatable relative to each other about said axis and said compensating means further comprises means for preventing rotation of one of said rings in the disengaged condition of the friction clutch.

46. The friction clutch of claim 1, wherein said diaphragm spring engages one of said rings in the disengaged condition of the friction clutch to thus prevent adjustment of said one ring.

47. The friction clutch of claim 1, wherein one of said rings is spaced apart from another of said components in the engaged condition of the friction clutch by a distance which is at least reduced in the disengaged condition of the friction clutch, at least one of said one ring and said other component being movable in the direction of said axis relative to the other of said one ring and said other component.

48. The friction clutch of claim 1, further comprising an attachment of metallic sheet material affixed to said pressure plate, said displacing device including ramps of one piece with said attachment.

49. The friction clutch of claim 48, wherein said pressure plate and said attachment define at least one coolant conveying channel extending, at least in part, substantially radially of said axis.

50. The friction clutch of claim 1, wherein at least one of said rings is disposed between said pressure plate and said diaphragm spring, said at least one ring being biased against said diaphragm spring in the disengaged condition of the friction clutch.

51. The friction clutch of claim 1, wherein at least one of said rings is disposed between said pressure plate and said diaphragm spring and bears against said housing in the disengaged condition of the friction clutch.

52. The friction clutch of claim 1, wherein said diaphragm spring abuts one of said rings at a first radial distance and one of said first, second, third, fourth and fifth components at a second radial distance from said axis, the difference between the radial distances of said rings from each other constituting at least 30 percent of the difference between said first and second radial distances.

53. The friction clutch of claim 1, wherein said diaphragm spring contacts one of said rings at a first radial distance and one of said first, second, third, fourth and fifth components at a different second radial distance from said axis, the difference between said first and second radial distances at least approximating the difference between the radial distances of said rings from said axis.

54. The friction clutch of claim 1, wherein said compensating means further comprises a wear detector which undergoes deformation through a first distance in response to disengagement of the friction clutch, said pressure plate being movable in response to disengagement of the friction clutch in the direction of said axis through a second distance at least approximating said first distance.

55. The friction clutch of claim 1, wherein at least one of said rings is provided on said housing and said compensating means further comprises a wear detector including a portion movable relative to said diaphragm spring through a distance $S \geq SD \times (L2:L1)$ wherein SD is the distance covered by the pressure plate for disengagement of the friction clutch, L1 is the difference between the radial distances of said rings from said axis and L2 is the difference between the radial distance of one of said rings and the radial distance of a location of contact between said diaphragm spring and said pressure plate.

56. The friction clutch of claim 1, wherein the clutch is disengageable by pulling a portion of said diaphragm spring, said rings being disposed between said diaphragm spring and said housing, one of said rings being disposed radially outwardly of the other of said rings and said diaphragm spring constituting a one-armed lever which is tiltable relative to said one ring at least during a first stage of disengagement of the friction clutch.

57. The friction clutch of claim 1, wherein the clutch is disengageable by pulling a portion of said diaphragm spring, one of said rings being disposed radially outwardly of the other of said rings and said diaphragm spring constituting a one-armed lever which is tiltable relative to said one ring during disengagement of the friction clutch, said rings being disposed between said pressure plate and said diaphragm spring.

58. The friction clutch of claim 1, wherein the clutch is disengageable by pushing a portion of said diaphragm spring, one of said rings being disposed radially inwardly of the other of said rings and said diaphragm spring constituting a two-armed lever which is pivoted relative to said one ring at least during a stage of disengagement of the friction clutch, said rings being located between said diaphragm spring and said pressure plate.

59. The friction clutch of claim 1, wherein said diaphragm spring is tiltable to effect disengagement of the friction clutch; and further comprising a resilient sensor defining a fulcrum for said diaphragm spring at least during a first stage of disengagement of the friction clutch.

60. The friction clutch of claim 59, wherein said diaphragm spring includes a radially outer portion which engages one of said rings upon completion of said first stage and pivots relative to said one ring during a second stage of disengagement of the friction clutch.

61. The friction clutch of claim 60, wherein said one ring is disposed radially outwardly of the other of said rings.

62. An engageable and disengageable friction clutch comprising an axially fixed component rotatable about a predetermined axis; a pressure plate; means for non-rotatably connecting said pressure plate to said component with freedom of movement in the direction of said axis; a rotary counterpressure plate adjacent said pressure plate; a torque transmitting clutch disc disposed between said plates and having friction linings which are subject to wear in response to repeated engagement and disengagement of the friction clutch; a diaphragm spring disposed between said component and said pressure plate as seen in the direction of said axis to normally bias said pressure plate toward said clutch disc so that said friction linings are clamped between said plates; and means for automatically compensating for wear at least upon said friction linings, said compensating means being disposed between said diaphragm spring and said component, said compensating means including two adjustable rings disposed at different radial distances from said axis.

63. The friction clutch of claim 62, wherein said component comprises a housing.

64. An engageable and disengageable friction clutch comprising a rotary axially fixed component rotatable about a predetermined axis; a rotary pressure plate; rotary means for non-rotatably connecting said pressure plate to said component with freedom of movement in the direction of said axis; a rotary counterpressure plate adjacent said pressure plate; a torque transmitting clutch disc disposed between said plates and having friction linings which are subject to wear in response to repeated engagement and disengagement of the friction clutch; a rotary diaphragm spring disposed between said component and said pressure plate to normally bias said pressure plate toward said clutch disc so that said friction linings are clamped between said plates; and means for automatically compensating for wear at least upon said friction linings, including concentric adjustable first and second rings respectively disposed at first and second radial distances from said axis and being displaceable in the direction of said axis toward said diaphragm spring, and means for adjusting said rings including first and second displacing units having portions turnable about said axis and means for turning said portions of said units to thereby displace the respective rings in the direction of said axis, one of (a) said rings and (b) one of said displacing units being turnable with respect to at least one of said axially fixed component, said pressure plate, said connecting means, said counterpressure plate and said diaphragm spring, said diaphragm spring including a portion disposed at a first radial distance from said axis and bearing upon one of said rings in the engaged condition of the friction clutch to thus prevent turning of said portion of the respective displacing unit, said compensating means further comprising a wear detector including a portion bearing upon the other of said rings at a second radial distance from said axis to exert a first force sufficient to prevent turning of said portion of the respective displacing unit in the absence of wear, a lesser second force in response to detected wear in the engaged condition of the friction clutch to thus permit an axial displacement of said other ring through a distance commensurate with the wear at least upon said friction linings and a third force greater than said second force during disengagement of the friction clutch.

65. The friction clutch of claim 64, wherein each of said displacing units includes at least one first ramp provided on one of said pressure plate and said component for each of said rings, said portions of said units comprising second ramps provided on said rings and abutting the respective first ramps.

66. The friction clutch of claim 64, wherein said component comprises a housing.

67. An engageable and disengageable friction clutch comprising a rotary housing rotatable about a predetermined axiss; a rotary pressure plate; rotary means for non-rotatably connecting said pressure plate to said housing with limited freedom of movement of said pressure plate in the direction of said axis; a rotary counterpressure plate adjacent said pressure plate; a torque transmitting clutch disc disposed between said plates and having friction linings which are subject to wear in response to repeated engagement and disengagement of the friction clutch; a rotary diaphragm spring disposed between said housing and said pressure plate to normally bias said pressure plate toward said clutch disc so that said friction linings are clamped between said plates; and means for automatically compensating for wear at least upon said friction linings, said compensating means comprising: (a) first and second rings disposed at different radial distances from said axis and being displaceable in the direction of said axis toward said diaphragm spring, and means for adjusting said rings including first and second displacing units and means for turning portions of said units to thereby displace the respective rings in the direction of said axis, one of (i) said rings and (ii) one of said displacing units being turnable with respect to at least one of said housing, said pressure plate, said connecting means, said counterpressure plate and said diaphragm spring, said diaphragm spring including a portion disposed at a radial distance from said axis and bearing upon one of the rings in the engaged condition of the friction clutch to thus prevent adjustment of the one ring, (b) a wear detector including a portion bearing upon the other of said rings at a radial distance from said axis other than the radial distance of said portion of said diaphragm spring to prevent adjustment of said other ring in the absence of wear, to permit adjustment of said other ring in response to detection of wear at least upon said friction linings with attendant axial displacement of said other ring, and to prevent adjustment of said other ring during disengagement of the friction clutch, and (c) means for blocking adjustment of said one ring except subsequent to adjustment of said other ring and to an extent commensurate with adjustment of said other ring.

68. The friction clutch of claim 67, wherein said displacing units comprise ramps.

69. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates; and means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, said compensating means operating between said housing and said diaphragm spring.

70. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates; and means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, said compensating means being installed between said housing and said diaphragm spring as seen in the direction of said axis.

71. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates; and means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, said one component being held against movement in the direction of said axis.

72. The friction clutch of claim 71, wherein said one component includes said housing.

73. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates; and means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, means for turning said displacing device about said axis, and means for biasing one of said rings against said housing in the disengaged condition of the friction clutch.

74. The friction clutch of claim 73, wherein said means for biasing said one ring against said housing includes said diaphragm spring.

75. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates, the clutch being disengageable by pushing a portion of said diaphragm spring; and means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, said rings being located between said housing and said diaphragm spring and one of said rings being disposed radially outwardly of the other of said rings, said diaphragm spring constituting a two-armed lever which is pivoted relative to said other ring during a phase of disengagement of the friction clutch.

76. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates;

means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, said displacing device including first ramps on one of said rings, complementary second ramps on said housing, third ramps on the other of said rings, and complementary fourth ramps on said housing, said second and fourth ramps being of one piece with said housing.

77. An engageable and disengageable friction clutch, comprising:

a first component including a housing rotatable about a predetermined axis;

a second component including a pressure plate;

a third component including means for non-rotatably connecting said pressure plate to said housing with limited freedom of movement in the direction of said axis;

a fourth component including a rotary counterpressure plate adjacent said pressure plate;

a fifth component including a torque transmitting clutch disc disposed between said plates and having friction linings which are subject to wear in response to repeated engagement and disengagement of the friction clutch;

a sixth component including a diaphragm spring disposed between said housing and said pressure plate to normally bias said pressure plate toward said clutch disc so that said friction linings are clamped between said plates; and means for automatically compensating for wear at least upon said friction linings, including two adjustable rings disposed at different radial distances from said axis and carried by one of said components for displacement in the direction of said axis toward said diaphragm spring, means for adjusting said rings including a displacing device turnable at least in part about said axis, and means for turning said displacing device about said axis, said displacing device including a plurality of neighboring ramps on said housing, and said housing comprising a passage between at least two of said ramps.

78. An engageable and disengageable friction clutch comprising a housing rotatable about a predetermined axis; a pressure plate rotatable with and movable within limits in the direction of said axis relative to said housing; energy storing means arranged to urge said pressure plate in the direction of said axis against friction linings on a clutch disc which is interposed between said pressure plate and a rotary counterpressure plate so that said friction linings are clamped between said plates in the engaged condition of the clutch, at least said friction linings being subject to wear in response to repeated engagement and disengagement of the clutch; means for engaging and disengaging the clutch; and means for automatically compensating for wear at least upon said friction linings, comprising two rings rotatable relative to and in a circumferential direction of said housing.

* * * * *